(12) United States Patent
Hu et al.

(10) Patent No.: US 9,565,634 B2
(45) Date of Patent: Feb. 7, 2017

(54) DATA TRANSMISSION METHOD, APPARATUS, AND SYSTEM, NETWORK SIDE DEVICE, AND TERMINAL DEVICE

(71) Applicant: Huawei Technologies Co., Ltd., Shenzhen (CN)

(72) Inventors: Zhenxing Hu, Beijing (CN); Jian Zhang, Beijing (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/748,105

(22) Filed: Jun. 23, 2015

(65) Prior Publication Data

US 2015/0365897 A1  Dec. 17, 2015

Related U.S. Application Data

(63) Continuation of application No. PCT/CN2013/090347, filed on Dec. 24, 2013.

(30) Foreign Application Priority Data

Dec. 24, 2012  (CN) .......................... 2012 1 0567504

(51) Int. Cl.
*H04B 7/00*  (2006.01)
*H04W 52/02*  (2009.01)
(Continued)

(52) U.S. Cl.
CPC ......... *H04W 52/0229* (2013.01); *H04W 4/005* (2013.01); *H04W 52/0225* (2013.01); *H04W 76/04* (2013.01); *Y02B 60/50* (2013.01)

(58) Field of Classification Search
CPC .. H04W 4/005; H04W 52/0261; H04W 60/04; H04W 60/06; H04W 68/005; H04W 72/1221; H04W 72/1242; H04W 76/02; H04W 72/042; H04W 72/04; H04W 52/0225; H04W 76/04
(Continued)

(56) References Cited

U.S. PATENT DOCUMENTS 6,377,790 B1    4/2002  Ishii
2005/0190709 A1  9/2005  Ferchland et al.
(Continued)

FOREIGN PATENT DOCUMENTS

CN  1947380 A     4/2007
CN  101459935 A   6/2009
(Continued)

*Primary Examiner* — Jean Gelin
(74) *Attorney, Agent, or Firm* — Slater Matsil, LLP

(57) ABSTRACT

A data transmission method, apparatus, and system, a network side device, and a terminal device. The data transmission method is applied to the terminal device and includes: setting the terminal device to be in a first non-activated state or a second non-activated state, where in the first non-activated state, the terminal device does not listen to a paging message, and in the second non-activated state, the terminal device listens to a paging message within a first preset listening time or a first preset quantity of listening times, and does not listen to a paging message when the first listening time or the first quantity of listening times is exceeded, setting the terminal device to be in a connected state, and sending, by the terminal device, the uplink data after updating system information; and receiving downlink data that is buffered by the network side device.

20 Claims, 8 Drawing Sheets

---

When a terminal device does not need to send uplink data, set the terminal device to be in a first non-activated state, where in the first non-activated state, the terminal device does not listen to a paging message  — 101

When the terminal device needs to send uplink data, set the terminal device to be in a connected state, update system information, send the uplink data, and receive downlink data that is buffered by a network side device when the terminal device is in the first non-activated state  — 102

(51) Int. Cl.
*H04W 4/00* (2009.01)
*H04W 76/04* (2009.01)

(58) Field of Classification Search
USPC .... 455/414.1, 417, 458, 459, 515, 560, 574, 455/517
See application file for complete search history.

(56) References Cited

U.S. PATENT DOCUMENTS

| | | | | |
|---|---|---|---|---|
| 2011/0075604 | A1* | 3/2011 | Fong | H04L 63/162 370/328 |
| 2012/0122495 | A1* | 5/2012 | Weng | H04W 68/025 455/458 |
| 2012/0155404 | A1* | 6/2012 | Shin | H04W 60/04 370/329 |
| 2012/0238208 | A1* | 9/2012 | Bienas | H04W 8/24 455/41.2 |
| 2012/0263106 | A1 | 10/2012 | Lee et al. | |
| 2013/0136072 | A1* | 5/2013 | Bachmann | H04W 4/00 370/329 |
| 2013/0343323 | A1* | 12/2013 | Kang | H04W 72/04 370/329 |

FOREIGN PATENT DOCUMENTS

| | | |
|---|---|---|
| CN | 102740460 A | 10/2012 |
| CN | 103338500 A | 10/2013 |

\* cited by examiner

DATA TRANSMISSION METHOD, APPARATUS, AND SYSTEM, NETWORK SIDE DEVICE, AND TERMINAL DEVICE

This application is a continuation of International Application No. PCT/CN2013/090347, filed on Dec. 24, 2013, which claims priority to Chinese Patent Application No. 201210567504.2, filed on Dec. 24, 2012, both of which are hereby incorporated by reference in their entireties.

TECHNICAL FIELD

The present invention relates to the field of communications technologies, and in particular, to a data transmission method, apparatus, and system, a network side device, and a terminal device.

BACKGROUND

In a communications technology network, such as the Internet of Things, a terminal device may be in two states, namely, a non-activated (Idle) state and a connected state in a process of communication between the terminal device and an application server. When the terminal device is in the non-activated state, a connection between the terminal device and a network side device is released, but a broadcast message and a paging message are listened to. In the connected state, the terminal device receives all downlink data and can send uplink data.

Generally, power is supplied for terminal devices by using batteries, and how to reduce power consumption of a terminal device that performs communication on a network is a key of whether the terminal device can be widely applied. In the prior art, a terminal device enters, according to a paging message listened to when the terminal device is in a non-activated state, a connected state to receive downlink data. In this way, the terminal device may be constantly switched between the non-activated state and the connected state, which causes relatively large power dissipation of the terminal device and high power consumption.

SUMMARY

Embodiments of the present invention provide a data transmission method, apparatus, and system, a network side device, and a terminal device, so as to reduce power consumption of the terminal device.

A first aspect of the embodiments of the present invention provides a data transmission method that is applied to a terminal device and includes setting the terminal device to be in a first non-activated state or a second non-activated state when the terminal device does not need to send uplink data. In the first non-activated state, the terminal device does not listen to a paging message; and in the second non-activated state, the terminal device listens to a paging message within the first preset listening time or a first preset quantity of listening times, and does not listen to a paging message when the first listening time or the first quantity of listening times is exceeded. When the terminal device needs to send uplink data, setting the terminal device to be in a connected state; if system information needs to be updated, sending, by the terminal device, the uplink data after updating the system information; and receiving downlink data that is buffered by a network side device when the terminal device is in the first non-activated state or the second non-activated state.

In a first possible implementation manner of the first aspect of the embodiments of the present invention, the method further includes after receiving a connection release message sent by the network side device, entering, by the terminal device, the first non-activated state or the second non-activated state.

Alternatively, after sending the uplink data and when not receiving the downlink data, entering, by the terminal device, the first non-activated state or the second non-activated state. Alternatively, after sending the uplink data and holding for a preset connection holding time, entering, by the terminal device, the first non-activated state or the second non-activated state. Alternatively, after the terminal device has been in the connected state for a preset connection holding time, entering, by the terminal device, the first non-activated state or the second non-activated state.

With reference to the first possible implementation manner of the first aspect of the embodiments of the present invention, in a second possible implementation manner of the first aspect of the embodiments of the present invention, the method further includes sending, by the terminal device, first instruction information to the network side device, where the first instruction information is used to instruct the network side device to skip releasing a connection between the network side device and the terminal device when a time for which the network side device and the terminal device are in the connected state is within the preset connection holding time; or instruct the network side device to skip releasing a connection between the network side device and the terminal device when a time of receiving the uplink data sent by the terminal device is within the preset connection holding time. Alternatively, the method includes receiving, by the terminal device, first configuration information sent by the network side device, where the first configuration information includes the preset connection holding time.

With reference to the first aspect of the embodiments of the present invention, or the first possible implementation manner of the first aspect, in a third implementation manner of the first aspect of the embodiments of the present invention, the method further includes when the terminal device is in the connected state, sending, by the terminal device, second instruction information to the network side device, where the second instruction information is used to instruct the network side device to release a connection between the network side device and the terminal device.

With reference to the first aspect of the embodiments of the present invention, or any one of the first possible implementation manner to the third implementation manner of the first aspect, in a fourth implementation manner of the first aspect of the embodiments of the present invention, when the terminal device is switched between the second non-activated state and the connected state, the method further includes receiving, by the terminal device, second configuration information sent by the network side device, where the second configuration information includes: a time point for listening to the paging message and the preset first listening time; the preset first listening time; a time point for listening to the paging message and the preset first quantity of listening times; or the preset first quantity of listening times.

With reference to the first aspect of the embodiments of the present invention, or any one of the first possible implementation manner to the fourth implementation manner of the first aspect, in a fifth implementation manner of the first aspect of the embodiments of the present invention, the method further includes sending, by the terminal device, a type of the terminal device to the network side device if the terminal device is switched between the first non-activated state and the connected state, so that the network side device buffers the downlink data according to the type of the terminal device when the terminal device is in the first non-activated state, where the terminal device is a type of terminal device that is switched between the first non-activated state and the connected state.

Alternatively, sending, by the terminal device, a type of the terminal device to the network side device if the terminal device is switched between the second non-activated state and the connected state, so that the network side device buffers the downlink data according to the type of the terminal device when the terminal device is in the second non-activated state and does not listen to the paging message, where the terminal device is a type of terminal device that is switched between the second non-activated state and the connected state.

A second aspect of the embodiments of the present invention provides a data transmission method that is applied to a network side device and includes buffering, by the network side device, downlink data of a terminal device when the terminal device is in a first non-activated state, where in the first non-activated state, the terminal device does not listen to a paging message; or when a terminal device is in a second non-activated state, buffering, by the network side device, downlink data of the terminal device when a preset second listening time or a preset second quantity of listening times for which the terminal device listens to a paging message is exceeded, where in the second non-activated state, the terminal device listens to a paging message within a preset first listening time or a preset first quantity of listening times, and does not listen to a paging message when the first listening time or the first quantity of listening times is exceeded.

When the terminal device enters a connected state in which the terminal device is connected to the network side device, receiving, by the network side device, uplink data sent by the terminal device, and sending, to the terminal device, the downlink data that is buffered when the terminal device is in the first non-activated state or the second non-activated state.

In a first possible implementation manner of the second aspect of the embodiments of the present invention, the method further includes receiving, by the network side device, first instruction information sent by the terminal device; and if the first instruction information is used to instruct the network side device to skip releasing a connection between the network side device and the terminal device when a time for which the network side device and the terminal device are in the connected state is within the preset connection holding time, releasing, by the network side device, the connection between the network side device and the terminal device according to the first instruction information after the time for which the network side device and the terminal device are in the connected state is the preset connection holding time; or if the first instruction information instructs the network side device to skip releasing a connection between the network side device and the terminal device when a time of receiving the uplink data sent by the terminal device is within the preset connection holding time, releasing, by the network side device, the connection between the network side device and the terminal device according to the first instruction information after the time of receiving the uplink data is the preset connection holding time.

Alternatively, sending, by the network side device, first configuration information to the terminal device, where the first configuration information includes the preset connection holding time.

With reference to the second aspect of the embodiments of the present invention, or the first possible implementation manner of the second aspect, in a second implementation manner of the second aspect of the embodiments of the present invention, the method further includes when the terminal device is in the connected state, receiving, by the network side device, second instruction information sent by the terminal device, where the second instruction information is used to instruct the network side device to release the connection between the network side device and the terminal device; and releasing, by the network side device, the connection between the network side device and the terminal device according to the second instruction information.

With reference to the second aspect of the embodiments of the present invention, or either of the first possible implementation manner and the second implementation manner of the second aspect, in a third implementation manner of the second aspect of the embodiments of the present invention, if the network side device buffers the downlink data of the terminal device when the preset second listening time or the preset second quantity of listening times is exceeded, the method further includes sending, by the network side device, second configuration information to the terminal device, where the second configuration information includes: a time point at which the terminal device listens to the paging message and the preset first listening time; the preset first listening time; a time point at which the terminal device listens to the paging message and the preset first quantity of listening times; or the preset first quantity of listening times.

With reference to the second aspect of the embodiments of the present invention, or any one of the first possible implementation manner to the third implementation manner of the second aspect, in a fourth implementation manner of the second aspect of the embodiments of the present invention, before the buffering, by the network side device, downlink data of the terminal device, the method further includes receiving, by the network side device, a type of the terminal device sent by the terminal device, and when the terminal device is a type of terminal device that is switched between the second non-activated state and the connected state, executing the step of buffering downlink data of the terminal device when a preset second listening time or a preset second quantity of listening times is exceeded; or when the terminal device is a type of terminal device that is switched between the first non-activated state and the connected state, executing the step of buffering downlink data when the terminal device is in a first non-activated state.

A third aspect of the embodiments of the present invention provides a data transmission apparatus, including an inactivation processing unit, configured to set, when uplink data does not need to be sent, the data transmission apparatus to be in a first non-activated state or a second non-activated state; where when the data transmission apparatus is in the first non-activated state, the inactivation processing unit does not listen to a paging message; and when the data transmission apparatus is in the second non-activated state, the inactivation processing unit listens to a paging message within the preset first listening time or a preset first quantity of listening times, and does not listen to a paging message when the first listening time or the first quantity of listening times is exceeded.

A connection processing unit, configured to: set, when uplink data needs to be sent, the data transmission apparatus to be in a connected state; send, if system information needs to be updated, the uplink data after updating the system information; and receive downlink data that is buffered by a network side device when the data transmission apparatus is in the first non-activated state or the second non-activated state.

In a first possible implementation manner of the third aspect of the embodiments of the present invention, the connection processing unit is further configured to trigger, after receiving a connection release message sent by the network side device, the inactivation processing unit to set the data transmission apparatus to be in the first non-activated state or the second non-activated state.

Alternatively, the connection processing unit is further configured to trigger, after the connection processing unit sends the uplink data and when the connection processing unit does not receive the downlink data, the inactivation processing unit to set the data transmission apparatus to be in the first non-activated state or the second non-activated state.

Alternatively, the connection processing unit is further configured to trigger, after sending the uplink data and holding for a preset connection holding time, the inactivation processing unit to set the data transmission apparatus to be in the first non-activated state or the second non-activated state.

Alternatively, the connection processing unit is further configured to trigger, after the data transmission apparatus has been set to be in the connected state for a preset connection holding time, the inactivation processing unit to set the data transmission apparatus to be in the first non-activated state or the second non-activated state.

With reference to the first possible implementation manner of the third aspect of the embodiments of the present invention, in a second implementation manner of the third aspect of the embodiments of the present invention, the apparatus further includes: a first instruction sending unit and/or a configuration receiving unit, where the first instruction sending unit is configured to send first instruction information to the network side device, where the first instruction information is used to instruct the network side device to skip releasing a connection between the network side device and the data transmission apparatus when a time for which the network side device and the data transmission apparatus are in the connected state is within the preset connection holding time; or instruct the network side device to skip releasing a connection between the network side device and the data transmission apparatus when a time of receiving the uplink data sent by the data transmission apparatus is within the preset connection holding time.

The configuration receiving unit is configured to receive first configuration information sent by the network side device, where the first configuration information includes the preset connection holding time.

With reference to the second possible implementation manner of the third aspect of the embodiments of the present invention, in a third implementation manner of the third aspect of the embodiments of the present invention, when the data transmission apparatus is switched between the second non-activated state and the connected state, the configuration receiving unit is further configured to receive second configuration information sent by the network side device, where the second configuration information includes: a time point for listening to the paging message and the preset first listening time; the preset first listening time; a time point for listening to the paging message and the preset first quantity of listening times; or the preset first quantity of listening times.

With reference to the third aspect of the embodiments of the present invention, or any one of the first possible implementation manner to the third implementation manner of the third aspect, in a fourth implementation manner of the third aspect of the embodiments of the present invention, the apparatus further includes a second instruction sending unit, configured to send, when the data transmission apparatus is in the connected state, second instruction information to the network side device, where the second instruction information is used to instruct the network side device to release the connection between the network side device and the data transmission apparatus.

With reference to the third aspect of the embodiments of the present invention, or any one of the first possible implementation manner to the fourth implementation manner of the third aspect, in a fifth implementation manner of the third aspect of the embodiments of the present invention, the apparatus further includes a type sending unit, configured to send a type of the data transmission apparatus to the network side device if the data transmission apparatus is switched between the first non-activated state and the connected state, so that the network side device buffers the downlink data according to the type of the data transmission apparatus when the data transmission apparatus is in the first non-activated state, where the type of the data transmission apparatus is an apparatus that is switched between the first non-activated state and the connected state. Alternatively, the type sending unit, configured to send a type of the data transmission apparatus to the network side device if the data transmission apparatus is switched between the second non-activated state and the connected state, so that the network side device buffers the downlink data according to the type of the data transmission apparatus when the data transmission apparatus is in the second non-activated state and does not listen to the paging message, where the type of the data transmission apparatus is an apparatus that is switched between the second non-activated state and the connected state.

A fourth aspect of the embodiments of the present invention provides a data transmission apparatus, including an inactivation buffering unit, configured to buffer downlink data of a terminal device when the terminal device is in a first non-activated state, where in the first non-activated state, the terminal device does not listen to a paging message; or the inactivation buffering unit, configured to buffer, when a terminal device is in a second non-activated state, downlink data of the terminal device when a preset second listening time or a preset second quantity of listening times for which the terminal device listens to a paging message is exceeded, where in the second non-activated state, the terminal device listens to a paging message within a preset first listening time or a preset first quantity of listening times, and does not listen to a paging message when the first listening time or the first quantity of listening times is exceeded. A connection transmission unit is configured to receive, when the terminal device enters a connected state in which the terminal device is connected to the data transmission apparatus, uplink data sent by the terminal device, and send, to the terminal device, the downlink data that is buffered by the inactivation buffering unit when the terminal device is in the first non-activated state or the second non-activated state.

In a first possible implementation manner of the fourth aspect of the embodiments of the present invention, the apparatus further includes: a first instruction processing unit and/or a configuration sending unit, where the first instruction processing unit is configured to: receive first instruction information sent by the terminal device; and if the first instruction information is used to instruct the data transmission apparatus to skip releasing a connection between the data transmission apparatus and the terminal device when a time for which the data transmission apparatus and the terminal device are in the connected state is within the preset connection holding time, release the connection between the data transmission apparatus and the terminal device according to the first instruction information after the time for which the data transmission apparatus and the terminal device are in the connected state is the preset connection holding time; or if the first instruction information instructs the data transmission apparatus to skip releasing a connection between the data transmission apparatus and the terminal device when a time for the data transmission apparatus to receive the uplink data sent by the terminal device is within the preset connection holding time, release the connection between the data transmission apparatus and the terminal device according to the first instruction information after the time for the data transmission apparatus to receive the uplink data is the preset connection holding time. The configuration sending unit is configured to send first configuration information to the terminal device, where the first configuration information includes the preset connection holding time.

With reference to the first possible implementation manner of the fourth aspect of the embodiments of the present invention, in a second implementation manner of the fourth aspect of the embodiments of the present invention, if the inactivation buffering unit buffers the downlink data of the terminal device when the preset second listening time or the preset second quantity of listening times is exceeded, the configuration sending unit is further configured to send second configuration information to the terminal device, where the second configuration information includes: a time point at which the terminal device listens to the paging message and the preset first listening time; the preset first listening time; a time point at which the terminal device listens to the paging message and the preset first quantity of listening times; or the preset first quantity of listening times.

With reference to the fourth aspect of the embodiments of the present invention, or either of the first possible implementation manner and the second implementation manner of the fourth aspect, in a third implementation manner of the fourth aspect of the embodiments of the present invention, the apparatus further includes a second instruction processing unit, configured to: receive, when the terminal device is in the connected state, second instruction information sent by the terminal device, where the second instruction information is used to instruct the data transmission apparatus to release the connection between the data transmission apparatus and the terminal device; and release the connection between the data transmission apparatus and the terminal device according to the second instruction information.

With reference to the fourth aspect of the embodiments of the present invention, or any one of the first possible implementation manner to the third implementation manner of the fourth aspect, in a fourth implementation manner of the fourth aspect of the embodiments of the present invention, the apparatus further includes a type receiving unit, configured to receive a type of the terminal device sent by the terminal device, where the inactivation buffering unit is configured to buffer, when the type of the terminal device received by the type receiving unit is a terminal device that is switched between the second non-activated state and the connected state, the downlink data of the terminal device when the preset second listening time or the preset second quantity of listening times is exceeded; or buffer, when the type of the terminal device received by the type receiving unit is a terminal device that is switched between the first non-activated state and the connected state, the downlink data when the terminal device is in the first non-activated state.

A fifth aspect of the embodiments of the present invention provides a terminal device, including a memory, a processor, an input apparatus, and an output apparatus that are separately connected to a bus, where the processor is configured to: set, when uplink data does not need to be sent, the terminal device to be in a first non-activated state or a second non-activated state, where in the first non-activated state, the terminal device does not listen to a paging message, and in the second non-activated state, the terminal device listens to a paging message within the preset first listening time or a preset first quantity of listening times, and does not listen to a paging message when the first listening time or the first quantity of listening times is exceeded; and set, when uplink data needs to be sent, the terminal device to be in a connected state, and if system information needs to be updated, control, after updating the system information, the output apparatus to send the uplink data.

The input apparatus is configured to receive, when the terminal device is in the connected state, downlink data that is buffered by a network side device when the terminal device is in the first non-activated state or the second non-activated state.

In a first possible implementation manner of the fifth aspect of the embodiments of the present invention, the processor is further configured to set the terminal device to be in the first non-activated state or the second non-activated state after the terminal device has been in the connected state for a preset connection holding time or after the output apparatus is controlled to send the uplink data and hold for a preset connection holding time.

The input apparatus is further configured to receive first configuration information sent by the network side device, where the first configuration information includes the preset connection holding time; or the processor is further configured to control the output apparatus to send first instruction information to the network side device, where the first instruction information is used to instruct the network side device to skip releasing a connection between the network side device and the terminal device when a time for which the network side device and the terminal device are in the connected state is within the preset connection holding time; or the first instruction information is used to instruct the network side device to skip releasing a connection between the network side device and the data transmission apparatus when a time of receiving the uplink data sent by the data transmission apparatus is within the preset connection holding time.

With reference to the first possible implementation manner of the fifth aspect of the embodiments of the present invention, in a second implementation manner of the fifth aspect of the embodiments of the present invention, the processor is further configured to set the terminal device to be in the first non-activated state, the second non-activated state, or a third non-activated state when the output apparatus sends the uplink data and does not receive the downlink data or after the input apparatus receives a connection release message sent by the network side device. The processor is further configured to control, when the terminal device is in the connected state, the output apparatus to send second instruction information to the network side device, where the second instruction information is used to instruct the network side device to release a connection between the network side device and the terminal device.

With reference to the fifth aspect of the embodiments of the present invention, or either of the first possible implementation manner and the second implementation manner of the fifth aspect, in a third implementation manner of the fifth aspect of the embodiments of the present invention, when the terminal device is switched between the second non-activated state and the connected state or switched between the third non-activated state and the connected state, the input apparatus is further configured to receive second configuration information sent by the network side device, where the second configuration information includes: a time point for listening to the paging message and the preset first listening time; the preset first listening time; a time point for listening to the paging message and the preset first quantity of listening times; or the preset first quantity of listening times.

The processor is further configured to listen, when the terminal device is in the second non-activated state, to the paging message according to information configured in the second configuration information received by the input apparatus.

With reference to the fifth aspect of the embodiments of the present invention, or either of the first possible implementation manner and the second implementation manner of the fifth aspect, in a fourth implementation manner of the fifth aspect of the embodiments of the present invention, if the terminal device is switched between the first non-activated state and the connected state, the processor is further configured to control the output apparatus to send a type of the terminal device to the network side device, so that the network side device buffers the downlink data according to the type of the terminal device when the terminal device is in the first non-activated state, where the type of the terminal device is a terminal device that is switched between the first non-activated state and the connected state.

Alternatively, if the terminal device is switched between the second non-activated state and the connected state, the processor is further configured to control the output apparatus to send a type of the terminal device to the network side device, so that the network side device buffers the downlink data according to the type of the terminal device when the terminal device is in the second non-activated state and does listen to the paging message, where the type of the terminal device is a terminal device that is switched between the second non-activated state and the connected state.

A sixth aspect of the embodiments of the present invention provides a network side device, including a memory, a processor, an input apparatus, and an output apparatus that are separately connected to a bus, where the processor is configured to buffer downlink data of a terminal device when the terminal device is in a first non-activated state, where in the first non-activated state, the terminal device does not listen to a paging message; or the processor is configured to buffer, when a terminal device is in a second non-activated state, downlink data of the terminal device when a preset second listening time or a preset second quantity of listening times for which the terminal device listens to a paging message is exceeded, where in the second non-activated state, the terminal device listens to a paging message within a preset first listening time or a preset first quantity of listening times, and does not listen to a paging message when the first listening time or the first quantity of listening times is exceeded. The input apparatus is configured to receive, when the terminal device enters a connected state in which the terminal device is connected to the network side device, uplink data sent by the terminal device. The output apparatus is configured to send, to the terminal device when the terminal device is in the connected state, downlink data that is buffered by the processor when the terminal device is in the first non-activated state or the second non-activated state.

In a first possible implementation manner of the sixth aspect of the embodiments of the present invention, the input apparatus is further configured to receive first instruction information sent by the terminal device; and if the first instruction information is used to instruct the network side device to skip releasing a connection between the network side device and the terminal device when a time for which the network side device and the terminal device are in the connected state is within the preset connection holding time, the processor is further configured to release the connection between the network side device and the terminal device according to the first instruction information after the time for which the network side device and the terminal device are in the connected state is the preset connection holding time; or if the first instruction information instructs the network side device to skip releasing a connection between the network side device and the terminal device when a time of receiving the uplink data sent by the terminal device is within the preset connection holding time, the processor is further configured to release the connection between the network side device and the terminal device according to the first instruction information after the time for the network side device to receive the uplink data is the preset connection holding time. Alternatively, the processor is further configured to control the output apparatus to send first configuration information to the terminal device, where the first configuration information includes the preset connection holding time.

With reference to the first possible implementation manner of the sixth aspect of the embodiments of the present invention, in a second implementation manner of the sixth aspect of the embodiments of the present invention, the input apparatus is further configured to receive, when the terminal device is in the connected state, second instruction information sent by the terminal device, where the second instruction information is used to instruct the network side device to release a connection between the network side device and the terminal device; and the processor is further configured to release the connection between the network side device and the terminal device according to the second instruction information.

With reference to the sixth aspect of the embodiments of the present invention, or either of the first possible implementation manner and the second implementation manner of the sixth aspect, in a third implementation manner of the sixth aspect of the embodiments of the present invention, when the downlink data of the terminal device is buffered when the preset second listening time or the preset second quantity of listening times is exceeded, the processor is further configured to control the output apparatus to send second configuration information to the terminal device, where the second configuration information includes: a time point at which the terminal device listens to the paging message and the preset first listening time; the preset first listening time; a time point at which the terminal device listens to the paging message and the preset first quantity of listening times; or the preset first quantity of listening times.

With reference to the sixth aspect of the embodiments of the present invention, or either of the first possible implementation manner and the second implementation manner of the sixth aspect, in a fourth implementation manner of the sixth aspect of the embodiments of the present invention, the input apparatus is further configured to receive a type of the terminal device sent by the terminal device. The processor is configured to execute, when the type of the terminal device received by the input apparatus is a terminal device that is switched between the first non-activated state and the connected state, the step of buffering downlink data of the terminal device when a preset second listening time or a preset second quantity of listening times is exceeded; or execute, when the type of the terminal device received by the input apparatus is a terminal device that is switched between the second non-activated state and the connected state, the step of buffering downlink data when the terminal device is in a first non-activated state.

A seventh aspect of the embodiments of the present invention provides a data transmission system, including a terminal device and a network side device. The terminal device is the data transmission apparatus according to the third aspect of the present invention, or any one of the first possible implementation manner to the fifth implementation manner of the third aspect, and the network side device is the data transmission apparatus according to the fourth aspect of the present invention, or any one of the first possible implementation manner to the fourth implementation manner of the fourth aspect.

An eighth aspect of the embodiments of the present invention provides a data transmission system, including the terminal device according to the fifth aspect of the present invention, or any one of the first possible implementation manner to the fourth implementation manner of the fifth aspect, and the network side device according to the sixth aspect of the present invention, or any one of the first possible implementation manner to the fourth implementation manner of the sixth aspect.

It may be seen that, in the embodiments of the present invention, when a terminal device does not send uplink data, the terminal device is set to be in a first non-activated state, and in this case, the terminal device does not listen to a paging message, and then does not constantly enter a connected state from the first non-activated state to receive downlink data; or when a terminal device does not send uplink data, the terminal device is set to be in a second non-activated state all the time, and in this case, the terminal device listens to a paging message in a period of time, so that the terminal device enters a connected state from the second non-activated state only in the period of time to receive downlink data, and in a process during which the terminal device does not listen to the paging message, the terminal device does not enter the connected state from the second non-activated state to receive the downlink data, which reduces times of switching between the non-activated state and the connected state and can reduce power dissipation of the terminal device, thereby reducing power consumption; in addition, only when the terminal device sends uplink data, the terminal device is set to be in the connected state, which can fully ensure that the terminal device transmits the uplink data and receives the downlink data, thereby ensuring uplink and downlink services.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Method Embodiment 1 of the Present Invention

A data transmission method is mainly applied to a data transmission system that primarily provides an uplink service, for example, the Internet of Things, which is called a machine to machine (Machine to Machine, M2M) network for short. However, the data transmission method in this embodiment is a method executed by a terminal device that includes an application apparatus and a communication apparatus, where the application apparatus and the communication apparatus may be separate entities, for example, an electricity meter (an application apparatus) in the Internet of Things and a device that is connected to the electricity meter and can perform communication, or the application apparatus and the communication apparatus may be two modules included in a same entity. Generally, the application apparatus uploads application information, for example, status information such as a number counted by an electricity meter, to a server on a network by using the communication apparatus.

Figure 1:
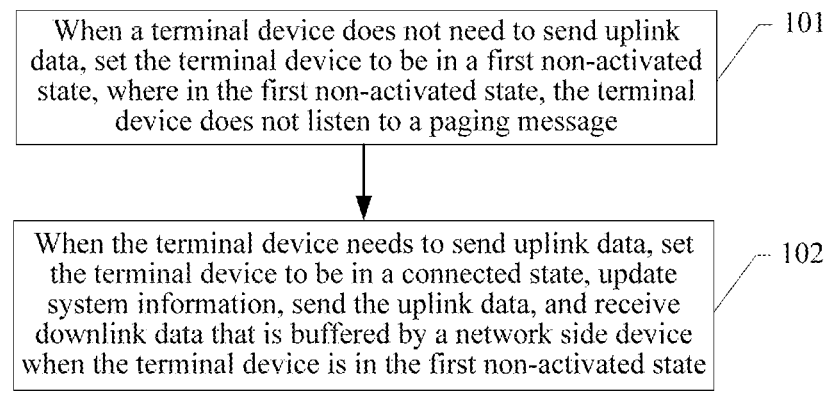
FIG. 1 is a flowchart of a data transmission method according to Method Embodiment 1 of the present invention.

When the terminal device is powered-on and registers with a network side, the terminal device may be in two states, namely, a non-activated state and a connected state. The method in this embodiment of the present invention is a data transmission method implemented after the terminal device is powered on and registers with the network side, and a flowchart is shown in FIG. 1, and the method includes:

Step 101: When a terminal device does not need to send uplink data, set the terminal device to be in a first non-activated state. An application apparatus in the terminal device may transmit state information of the application apparatus, and the like to a communication apparatus, and if the communication apparatus does not receive uplink data, it indicates that the terminal device does not need to upload uplink service data, and the terminal device is set to be in the first non-activated state. Specifically, the terminal device may be triggered to operate in the first non-activated state.

In this embodiment, in the first non-activated state, the terminal device does not listen to a paging message, and therefore, does not receive downlink data sent by a network side device, where the paging message herein is delivered by the network side device to the terminal device, may be used to instruct the terminal device to receive changes in a service and system information or may be used to page the terminal device and require the terminal device to establish a connection to the network side device, and the like. In the first non-activated state, the terminal device does not listen to a broadcast message either, where the broadcast message is broadcast by a base station and may include a system information block (System Information Block, SIB) and the like. The foregoing system information may be specifically used to instruct the terminal device to access information, such as information about an occupied channel and an uplink and downlink timeslot, which is required by the base station.

When the terminal device is in the first non-activated state, if the network side device has downlink data that needs to be sent to the terminal device, the downlink data may be buffered first, for example, when a server on a core network sends, to an access network of the terminal device, downlink data that is to be sent to the terminal device, an access network side device such as a serving gateway (Serving Gateway, SGW) buffers the downlink data first, and then sends the buffered downlink data to the terminal device when the terminal device is in the connected state.

Step 102: When the terminal device needs to send uplink data, set the terminal device to be in a connected state, and if system information needs to be updated, the terminal device sends the uplink data after updating the system information, and receives downlink data that is buffered by a network side device when the terminal device is in the first non-activated state.

Because in the first non-activated state, the terminal device does not listen to the paging message, the terminal device does not receive any downlink data sent by the network side device, and the terminal device does not learn a change in the system information. When the terminal device enters the connected state from the non-activated state to send the uplink data, it is required to acquire the system first and determine whether the system information is consistent with system information stored in the terminal device. Specifically, whether a value tag (value tag) in the system information is consistent with a stored value is determined; if the version tag in the system information is inconsistent with the stored value, the system information stored in the terminal device needs to be updated, and only in this way can the terminal device communicate with the network side device correctly.

Further, because the terminal device may move constantly, if in the first non-activated state, the terminal device moves but does not execute a step of location updating, when the terminal device is set to be in the connected state, location updating further needs to be performed, so as to update current location information of the terminal device and send updated information to the network side device.

The foregoing setting the terminal device to be in a connected state refers to re-establishing a connection between the terminal device and the network side device, and in this way, the terminal device can not only send the uplink data according to the foregoing updated system information, but also receive the downlink data that is buffered by the network side device when the terminal device is in the first non-activated state.

It should be noted that, the foregoing steps 101 and 102 have no absolute sequence relationship, but are specific execution steps when the terminal device is in two different statuses, and FIG. 1 shows only one of specific implementation manners.

It may be seen that, when a terminal device in this embodiment of the present invention does not send uplink data, the terminal device is set to be in a first non-activated state, and does not listen to a paging message in the first non-activated state. In this way, the terminal device does not receive any downlink data, nor constantly enter a connected state from the first non-activated state to receive downlink data, which reduces times of switching between the non-activated state and the connected state and can reduce power dissipation of the terminal device, thereby reducing power consumption; in addition, only when the terminal device sends uplink data, the terminal device is set to be in the connected state, which can fully ensure that the terminal device transmits the uplink data and receives the downlink data, thereby ensuring uplink and downlink services.

To further reduce the power consumption of the terminal device, the terminal device may enter the foregoing first non-activated state after the foregoing step 102 is executed, that is, after the uplink data is sent and when no downlink data is received, or after the terminal device receives, in the connected state, a connection release message sent by the network side device. In this case, the terminal device may actively send, in the connected state, second instruction information to the network side device, where the second instruction information is used to instruct the network side device to release a connection between the network side device and the terminal device, which does not require the network side device to determine whether to release the connection between the network side device and the terminal device; the network side device may release the connection after receiving the second instruction information.

In a process of switching the terminal device from the connected state to the first non-activated state, that the terminal device is switched from the connected state to the first non-activated state may also be that: the terminal device enters the first non-activated state provided that the terminal device has been in the connected state for a preset connection holding time t; or the terminal device enters the first non-activated state provided that the terminal device sends the uplink data and holds for a preset connection holding time t. The preset connection holding time t may be fixedly set in the terminal device, and in this case, the terminal device may actively send, in the connected state or in a power-on and registering process, first instruction information to the network side device, where the first instruction information is used to instruct the network side device to skip releasing the connection between the network side device and the terminal device when a time for which the network side device and the terminal device are in the connected state is within the preset connection holding time t; or the first instruction information is used to instruct the network side device to skip releasing the connection between the network side device and the terminal device when a time of receiving the uplink data sent by the terminal device is within the preset connection holding time t. In these two cases, after a time of a corresponding operation exceeds the preset connection holding time t, the network side device actively releases the connection between the network side device and the terminal device, which does not require the terminal device to further send the second instruction information to instruct the network side device to release the connection. Specifically, after the network side device receives the first instruction information, if the network side device and the terminal device are in the connected state, a timer may be started and a time of the timer may be set to the foregoing preset connection holding time, and the connection is not released until the timer is stopped; or the timer is started after the network side device receives the last piece of the uplink data of the terminal device.

The foregoing preset connection holding time may also be configured for the terminal device by the network side device. Specifically, in the connected state, the terminal device may receive, from a data plane or a user plane, first configuration information sent by the network side device, where the first configuration information includes the preset connection holding time; or the terminal device receives, in the power-on and registering process, first configuration information sent by the network side device. In addition, the network side device may send the first configuration information to the terminal device by using a new message or an existing message. In this case, the network side device knows the connection holding time t; the network side device actively releases the connection between the network side device and the terminal device after the corresponding operation exceeds the connection holding time t, which does not require the terminal device to send the first instruction information to instruct the network side device to release the connection.

It should be noted that, the method in the foregoing embodiment is mainly aimed at a terminal device that primarily provides an uplink service; however, some terminal devices that have relatively more downlink services do not need to use the method in the foregoing embodiment to perform data transmission. To better distinguish these two types of terminal devices, a type of terminal device that uses the method in this embodiment of the present invention may be set to a terminal device that is switched between the foregoing first non-activated state and the connected state. The terminal device may send the type of the terminal device to the network side device in the power-on and registering process, and in this way, the network side device buffers downlink data of the terminal device according to the type of the terminal device when the terminal device is in the foregoing first non-activated state; because in another embodiment, the network side device knows the type of the terminal device, the terminal device may not need to configure the type of the terminal device in the network side device, and the network side device actively buffers the downlink data of the terminal device when the terminal device is in the first non-activated state.

Method Embodiment 2 of the Present Invention

Figure 2:
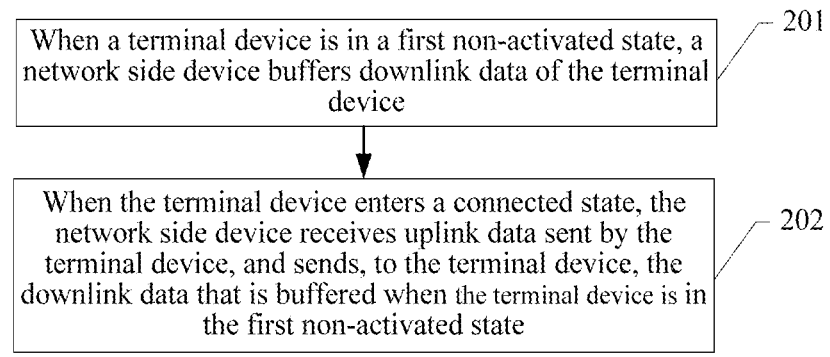
FIG. 2 is a flowchart of a data transmission method according to Method Embodiment 2 of the present invention.

A data transmission method is mainly applied to a data transmission system that primarily provides an uplink service, where a terminal device in the data transmission system includes an application apparatus and a communication apparatus. The method in this embodiment is a method executed by the network side device in the method in the foregoing Embodiment 1, where a flowchart of the method is shown in FIG. 2, and the method includes:

Step 201: When a terminal device is in a first non-activated state, a network side device buffers downlink data of the terminal device.

Step 202: When the terminal device enters a connected state in which the terminal device is connected to the network side device, the network side device receives uplink data sent by the terminal device, and sends, to the terminal device, the downlink data that is buffered in step 201.

Steps executed by the terminal device are described in the foregoing Embodiment 1, and details are not repeatedly described herein. In the first non-activated state, the terminal device does not listen to a paging message sent by the network side device, nor receive downlink data, and in this case, the network side device needs to buffer downlink data that needs to be sent, and send the buffered downlink data to the terminal device when the terminal device is in the connected state.

It should be noted that, in a specific embodiment, the network side device does not execute the foregoing steps 201 to 202 for all terminal devices, but the network side device executes the foregoing steps 201 to 202 provided that a type of a terminal device is a terminal device that is switched between the foregoing first non-activated state and the connected state; with respect to a terminal device of another type, if there is downlink data, the network side device instantly pages the terminal device by using a paging message, so that the terminal device enters the connected state to receive the downlink data. The type of the terminal device may be sent to the network side device by the terminal device in a power-on and registering process of the terminal device, or may be locally preconfigured by the network side device.

The foregoing steps 201 and 202 have no absolute sequence relationship, but are specific execution steps when the terminal device is in two different states, and FIG. 2 shows only one of specific implementation manners.

In this embodiment of the present invention, when a terminal device does not send uplink data, the terminal device is set to be in a first non-activated state, and does not listen to a paging message in the first non-activated state. In this way, the terminal device does not receive any downlink data, and a network side device needs to buffer downlink data first, so that the terminal device does not constantly enter a connected state from the first non-activated state to receive the downlink data, which reduces times of switching of the terminal device between the non-activated state and the connected state, thereby reducing power dissipation of the terminal device and power consumption; in addition, when the terminal device sends uplink data, the terminal device is set to be in the connected state, which can fully ensure that the terminal device transmits the uplink data and receives the downlink data buffered by the network side device, thereby ensuring uplink and downlink services.

Figure 3:
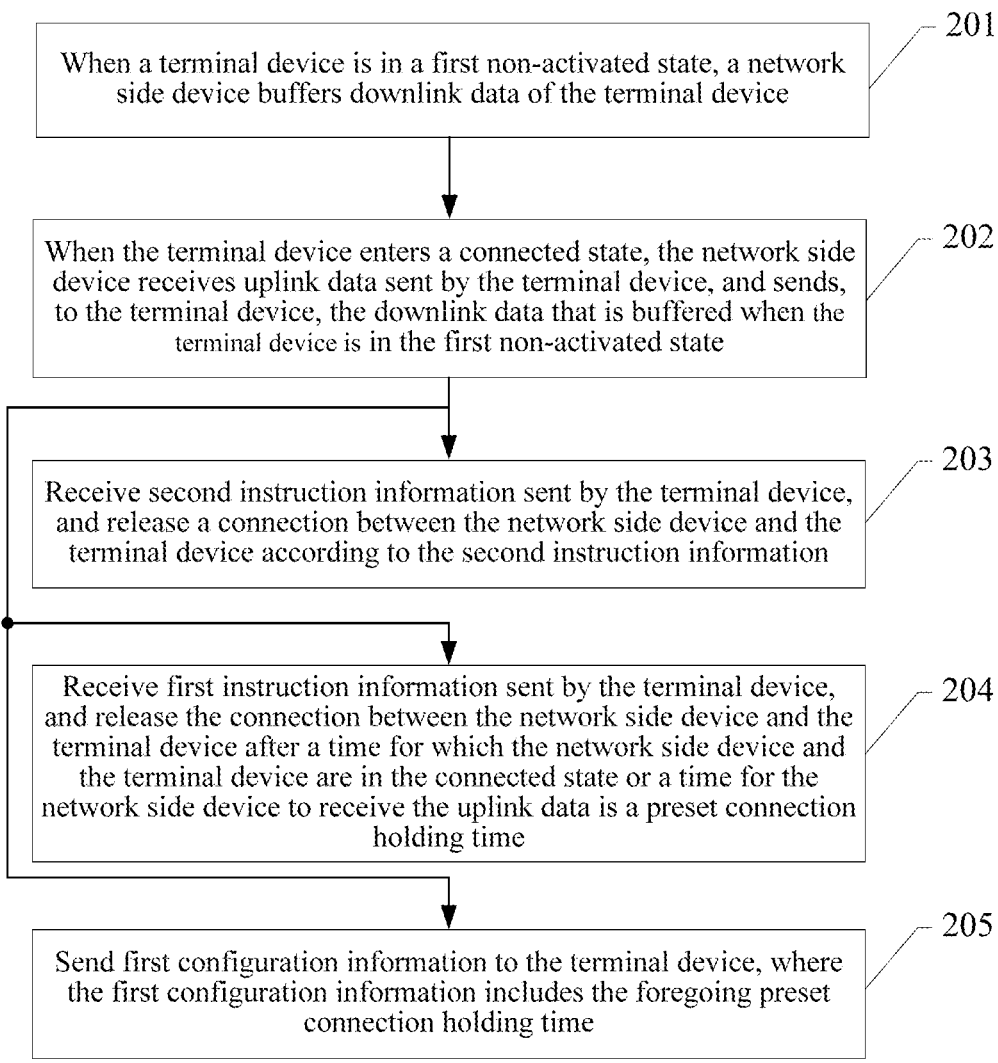
FIG. 3 is a flowchart of another data transmission method according to Method Embodiment 2 of the present invention.

As shown in FIG. 3, in a specific embodiment, in addition to executing the foregoing steps 201 and 202, the network side device may passively release a connection by executing step 203 when the terminal device is in the connected state; the network side device may further passively hold the connection between the network side device and the terminal device by executing step 204; the network side device may further actively configure a connection holding time for the terminal device by executing step 205, to hold the connection between the network side device and the terminal device.

Step 203: The network side device receives second instruction information sent by the terminal device, where the second instruction information is used to instruct the network side device to release a connection between the network side device and the terminal device; then releases the connection between the network side device and the terminal device according to the second instruction information.

Step 204: When the terminal device is in the connected state or in a power-on and registering process, the network side device may receive first instruction information sent by the terminal device; if the first instruction information is used to instruct the network side device to skip releasing the connection between the network side device and the terminal device when a time for which the network side device and the terminal device are in the connected state is within a preset connection holding time t, the network side device releases the connection between the network side device and the terminal device according to the first instruction information after the time for which the network side device and the terminal device are in the connected state is the preset connection holding time t. Specifically, after the network side device receives the first instruction information, if the network side device and the terminal device are in the connected state, a timer may be started and a time may be set to the preset connection holding time t, and the connection between the network side device and the terminal device is not released until the timer is stopped.

If the first instruction information instructs the network side device to skip releasing the connection between the network side device and the terminal device when a time of receiving the uplink data sent by the terminal device is within a preset connection holding time t, the network side device releases the connection between the network side device and the terminal device according to the first instruction information after the time of receiving the uplink data is the preset connection holding time. Specifically, the foregoing timer may be stared after the network side device receives the last piece of the uplink data.

Step 205: The network side device sends first configuration information to the terminal device, where the first configuration information includes the foregoing preset connection holding time t, and in this way, the network side device actively releases the connection between the network side device and the terminal device after the time for which the network side device is connected to the terminal device is the preset connection holding time t. Specifically, the network side device may send, when the terminal device is in the connected state, the first configuration information by using a user plane or a data plane; or in the power-on and registering process of the terminal device, the network side device sends the first configuration information to the terminal device. In addition, the first configuration information may be added to a new message or added to an existing message used for communication between the network side device and the terminal device, so as to be sent to the terminal device.

The foregoing steps 203 to 205 are respectively three substeps for performing data transmission by the network side device, where step 205 and step 202 have no absolute sequence relationship, and may be executed at the same time or may be executed subsequently, and FIG. 3 shows only one of specific implementation manners.

Method Embodiment 3 of the Present Invention

A data transmission method is mainly applied to a data transmission system that primarily provides an uplink service, and the method in this embodiment is a method executed by a terminal device including an application apparatus and a communication apparatus, where the application apparatus and the communication apparatus may be separate entities, or may be two modules included in a same entity.

Figure 4:
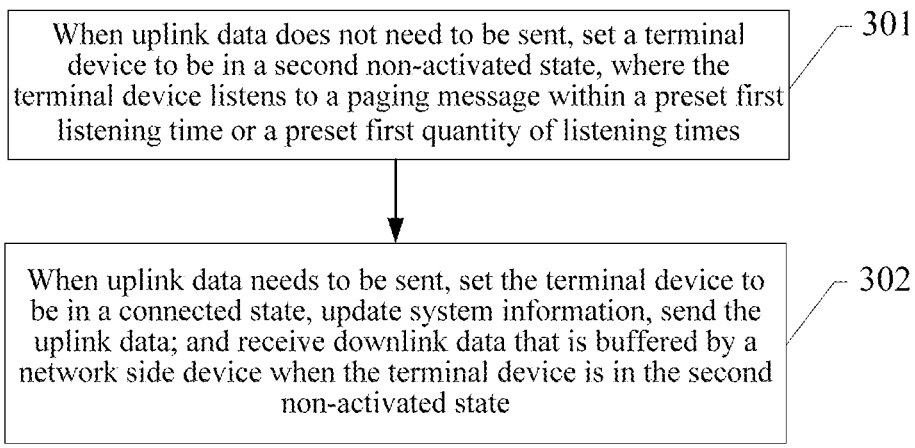
FIG. 4 is a flowchart of a data transmission method according to Method Embodiment 3 of the present invention.

When the terminal device is powered-on and registers with a network side, the terminal device may be in two states, namely, a non-activated state and a connected state. The method in this embodiment of the present invention is a data transmission method implemented after the terminal device is powered on and registers with the network side, and a flowchart is shown in FIG. 4, and the method includes:

Step 301: When a terminal device does not need to send uplink data, set the terminal device to be in a second non-activated state. If a communication apparatus in the terminal device does not receive uplink data sent by an application apparatus, it indicates that the terminal device does not need to upload uplink service data, and the terminal device is set to be in the second non-activated state. Specifically, the terminal device may be triggered to operate in the second non-activated state.

In this embodiment, in the second non-activated state, the terminal device may listen to a paging message within a preset first listening time t1, and does not listen to a paging message after the first listening time t1 is exceeded, and in this case, the terminal does not receive, for a period of time, any downlink data sent by a network side device. Alternatively, in the second non-activated state, the terminal device may also listen to a paging message in a preset first quantity of listening times N1, and does not listen to a paging message after the first quantity of listening times N1 is exceeded. Herein, one time of active search for a paging message performed by the terminal device is recorded as one time of paging message listening, and the preset first listening time t1 and the preset first quantity of listening times N1 may be fixedly set in the terminal device or may be configured for the terminal device by the network side device.

Specifically, the terminal device may receive second configuration information sent by the network side device, where the second configuration information may include: a time point for listening to the paging message and the preset first listening time t1; the preset first listening time t1; a time point for listening to the paging message and the preset first quantity of listening times N1; or the preset first quantity of listening times N1. The second configuration information may be sent, when the terminal device is in the second non-activated state and listens to the paging message, to the terminal device by the network side device by using a broadcast message, or may be sent, when the terminal device is in a connected state, to the terminal device by the network side device by using a new message or an existing message.

When the terminal device is in the second non-activated state, if the terminal device does not listen to a paging message, the network side device may first buffer downlink data that needs to be sent to the terminal device, and then sends the buffered downlink data to the terminal device when the terminal device is in the connected state. If the terminal device listens to a paging message, and if the network side device needs to send downlink data to the terminal device, the network side device pages the terminal device by using a paging message, and requires the terminal device to be switched to the connected state to receive the downlink data.

Step 302: When the terminal device needs to send uplink data, set the terminal device to be in a connected state, and if system information needs to be updated, the terminal device sends the uplink data after updating the system information; the terminal device needs to receive downlink data that is buffered by a network side device when the terminal device is in the second non-activated state. Specifically, it is required that the uplink data is sent and the downlink data is received according to updated system information.

Because in the second non-activated state, the terminal device may not listen to a paging message for a period of time, and in this way, the terminal device does not learn a change in the system information. When the terminal device enters the connected state from the second non-activated state to send the uplink data, the system information needs to be acquired first, and it is required to determine whether the system information is consistent with system information stored in the terminal device. If not, the system information stored in the terminal device needs to be updated, so that the terminal device can communicate with the network side device correctly. Further, if in the second non-activated state, the terminal device moves but does not execute a step of location updating, when the terminal device is set to be in the connected state, location updating needs to be performed first, so as to update current location information of the terminal device and send updated information to the network side device.

It should be noted that, the terminal device is set to be in the connected state when the terminal device needs to send uplink data. Besides, in this embodiment, because in the second non-activated state, the terminal device listens to a paging message for a period of time, if the network side device pages the terminal device in this period of time, the terminal device may enter the connected state from the second non-activated state.

The foregoing steps 301 and 302 have no absolute sequence relationship, but are specific execution steps when the terminal device is in two different states, and FIG. 4 shows only one of specific implementation manners.

It may be seen that, when a terminal device in this embodiment of the present invention does not send uplink data, the terminal device is set to be in a second non-activated state, and in the second non-activated state, the terminal device listens to a paging message within a preset first listening time or a preset first quantity of listening times, and does not listen to a paging message when the first listening time or the first quantity of listening times is exceeded. In this way, the terminal device receives downlink data in the second non-activated state only in a period of time for listening to the paging message, but in a period of time for not listening to the paging message, the terminal device does not constantly enter a connected state from the second non-activated state to receive the downlink data, which reduces times of switching between the non-activated state and the connected state and can reduce power dissipation of the terminal device, thereby reducing power consumption; in addition, the terminal device is set to be in the connected state when the terminal device sends the uplink data, which can fully ensure that the terminal device transmits the uplink data and receives the downlink data, thereby ensuring uplink and downlink services To further reduce the power consumption of the terminal device, after the foregoing step 302 is executed, that is, after the uplink data is sent and when no downlink data is received, or after the terminal device receives, in the connected state, a connection release message sent by the network side device, the terminal device may enter the foregoing second non-activated state or the first non-activated state described in the foregoing embodiment. In this case, the terminal device may actively send, in the connected state, second instruction information to the network side device, where the second instruction information is used to instruct the network side device to release a connection between the network side device and the terminal device, and the network side device may release the connection after receiving the second instruction information.

In another case, in a process of switching the terminal device from the connected state to the first or the second non-activated state, that the terminal device is switched from the connected state to the first or the second non-activated state may also be that: the terminal device enters the first or the second non-activated state after the terminal device has been in the connected state for a preset connection holding time t or after the terminal device sends the uplink data and holds for a preset connection holding time t, where the preset connection holding time t may be fixedly set in the terminal device; in this case, the terminal device may actively send, in the connected state or in a power-on and registering process, first instruction information to the network side device, where the first instruction information is used to instruct the network side device to skip releasing the connection between the network side device and the terminal device when a time for which the network side device and the terminal device are in the connected state is within the preset connection holding time t, or the first instruction information is used to instruct the network side device to skip releasing the connection between the network side device and the terminal device when a time of receiving the uplink data sent by the terminal device is within the preset connection holding time t; after a time of a corresponding operation exceeds the preset connection holding time t, the network side device actively releases the connection between the network side device and the terminal device, which does not require the terminal device to further send second instruction information to instruct the network side device to release the connection.

The foregoing preset connection holding time may also be configured for the terminal device by the network side device. Specifically, in the connected state, the terminal device may receive, from a data plane or a user plane, first configuration information sent by the network side device, where the first configuration information includes the preset connection holding time; or the terminal device receives, in the power-on and registering process, first configuration information sent by the network side device; or when the terminal device is in the second non-activated state and listens to the paging message, the network side device may send first configuration information to the terminal device by using a broadcast message, and in this way, the terminal device may acquire the first configuration information from the broadcast message.

It should be noted that, the method in this embodiment is mainly aimed at a terminal device that primarily provides an uplink service; however, some terminal devices that have relatively more downlink services do not need to use the method in this embodiment to perform data transmission. To better distinguish these two types of terminal devices, if a terminal device needs to be in the second non-activated state, the terminal device may send a type of the terminal device to the network side device in a power-on and registering process, and in this way, the network side device may buffer downlink data of the terminal device according to the type of the terminal device when the terminal device is in the foregoing second non-activated state and does not listen to a paging message; with respect to a terminal device of another type, the network side device does not buffer downlink data when the terminal device is in a non-activated state the terminal device is a type of terminal device that is switched between a second non-activated state and a connected state.

In this case, downlink data may be buffered in the network side device when a preset second listening time t2 or a preset second quantity of listening times N2 of the terminal device is exceeded, and therefore, when the terminal device is in the second non-activated state and listens to a paging message in the preset first listening time t1, the network side device does not buffer the downlink data of the terminal device within the preset second listening time t2, but buffers the downlink data of the terminal device only if the terminal device is still in the second non-activated state after the second listening time t2 is exceeded; when the terminal device is in the second non-activated state and listens to a paging message within the preset first quantity of listening times N1, the network side device does not buffer the downlink data of the terminal device when determining that the terminal device performs listening within the second quantity of listening times N2, but buffers the downlink data of the terminal device only if the terminal device is still in the second non-activated state after the second quantity of listening times N2 is exceeded. The foregoing first listening time t1 may equal or may not equal the second listening time t2, and the first quantity of listening times N1 may equal or may not equal the second quantity of listening times N2.

Method Embodiment 4 of the Present Invention

Figure 5:
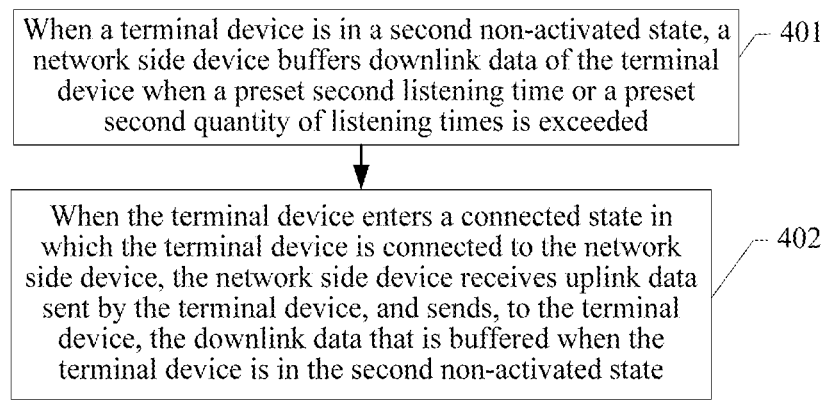
FIG. 5 is a flowchart of a data transmission method according to Method Embodiment 4 of the present invention.

A data transmission method is mainly applied to a data transmission system that primarily provides an uplink service, where a terminal device in the data transmission system includes an application apparatus and a communication apparatus. The method in this embodiment is a method executed by the network side device in the method in the foregoing Embodiment 3, where a flowchart of the method is shown in FIG. 5, and the method includes:

Step 401: When a terminal device is in a second non-activated state, a network side device buffers downlink data of the terminal device when a preset second listening time t2 or a preset second quantity of listening times N2 within which the terminal device listens to a paging message is exceeded, and correspondingly, in the second non-activated state, the terminal device listens to a paging message within a preset first listening time t1 or a preset first listening quantity of listening times N1. The first listening time t1 may equal or may not equal the second listening time t2, and the first quantity of listening times N1 may equal or may not equal the second quantity of listening times N2.

That the network side device buffers downlink data when a preset second listening time t2 or a preset second quantity of listening times N2 is exceeded specifically refers to that: the network side device does not buffer the downlink data within the second listening time t2 but buffers the downlink data only if the terminal device is still in the second non-activated state when the second listening time t2 is exceeded; or the network side device buffers the downlink data provided that a quantity of times for which the terminal device listens to the paging message exceeds the second quantity of listening times N2.

Step 402: When the terminal device enters a connected state in which the terminal device is connected to the network side device, the network side device receives uplink data sent by the terminal device, and the network side device sends, to the terminal device, the downlink data that is buffered when the terminal device is in the second non-activated state.

Steps executed by the terminal device are described in the foregoing Embodiment 3, and details are not repeatedly described herein. In the second non-activated state, for a period of time, the terminal device does not listen to a paging message sent by the network side device, and in this period of time, the network side device needs to buffer downlink data that needs to be sent, and send the buffered downlink data to the terminal device when the terminal device is in the connected state.

It should be noted that, in a specific embodiment, the network side device does not execute the foregoing steps 401 to 402 for all terminal devices, but the network side device executes the foregoing steps 401 to 402 provided that a type of a terminal device is a terminal device that is switched between the foregoing second non-activated state and the connected state; with respect to a terminal device of another type, if there is downlink data, the network side device instantly pages the terminal device by using a paging message, so that the terminal device enters the connected state to receive the downlink data. The type of the terminal device may be sent to the network side device by the terminal device in a power-on and registering process of the terminal device, or may be locally preconfigured by the network side device.

The foregoing steps 401 and 402 have no absolute sequence relationship, but are specific execution steps when the terminal device is in two different states, and FIG. 5 shows only one of specific implementation manners.

In this embodiment of the present invention, when a terminal device does not send uplink data, the terminal device is set to be in a second non-activated state and does not listen to a paging message for a period of time in the second non-activated state, and the terminal device enters a connected state from the second non-activated state only in a period of time for listening the paging message, to receive downlink data, and does not constantly enter the connected state from the second non-activated state in the period of time for not listening to the paging message, to receive the downlink data, which reduces times of switching of the terminal device between the non-activated state and the connected state and can reduce power dissipation of the terminal device, thereby reducing power consumption. A network side device needs to buffer the downlink data first when a preset second listening time or a preset second quantity of listening times for which the terminal device listens to the paging message is exceeded, and the terminal device is set to be in the connected state when the terminal device sends the uplink data, which can fully ensure that the terminal device transmits the uplink data and receives the downlink data buffered by the network side device, thereby ensuring uplink and downlink services.

Figure 6:
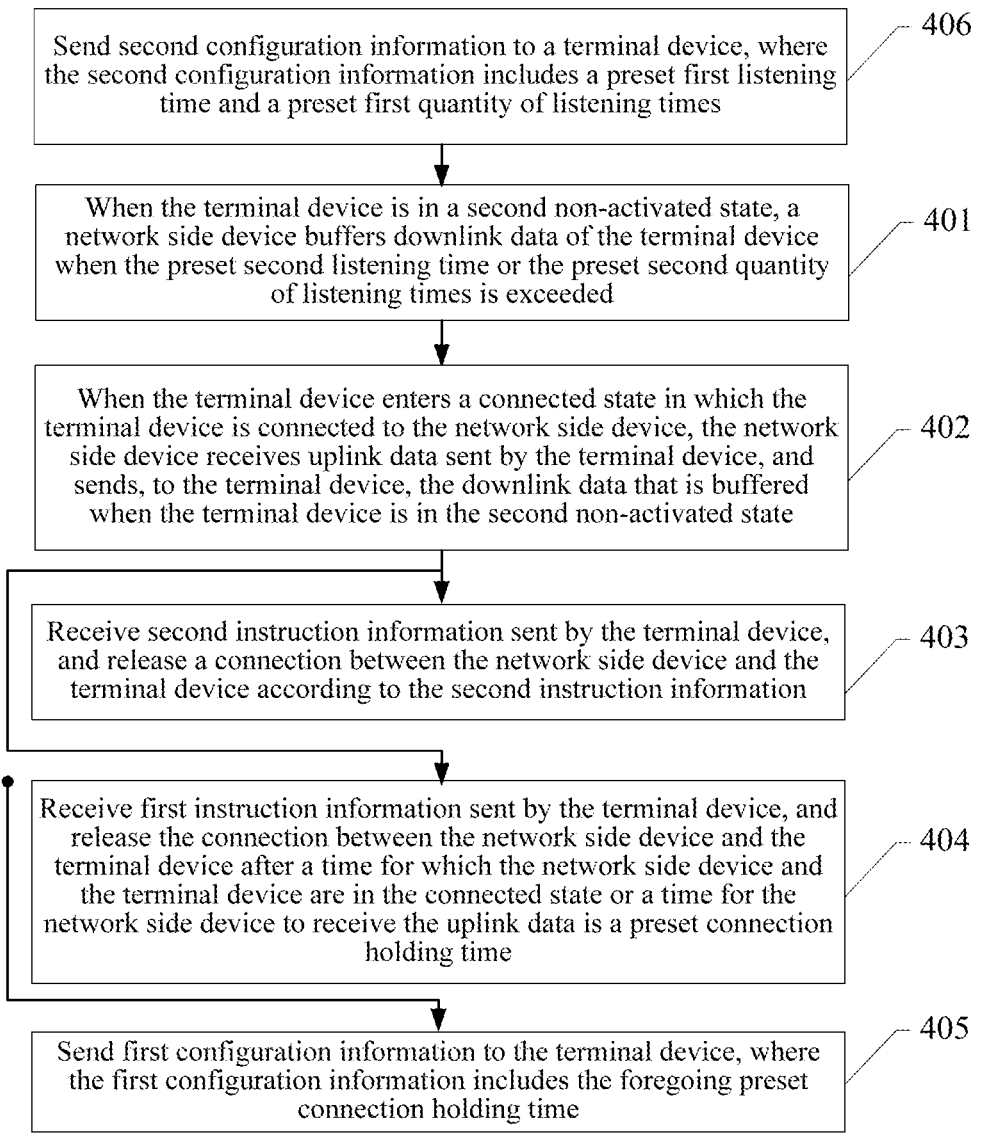
FIG. 6 is a flowchart of another data transmission method according to Method Embodiment 4 of the present invention.

As shown in FIG. 6, in a specific embodiment, in addition to executing the foregoing steps 401 and 402, the network side device may passively release a connection by executing step 403 when the terminal device is in the connected state; the network side device passively holds the connection between the network side device and the terminal device by executing step 404; the network side device may further actively configure a connection holding time for the terminal device by executing step 405, to hold the connection between the network side device and the terminal device; the network side device may further configure, by executing step 406 before step 401, information indicating that the terminal device is in the second non-activated state.

Step 403: The network side device receives second instruction information sent by the terminal device, where the second instruction information is used to instruct the network side device to release a connection between the network side device and the terminal device; then releases the connection between the network side device and the terminal device according to the second instruction information.

Step 404: The network side device receives first instruction information sent by the terminal device, and if the first instruction information is used to instruct the network side device to skip releasing the connection between the network side device and the terminal device when a time for which the network side device and the terminal device are in the connected state is within a preset connection holding time t, the network side device releases the connection between the network side device and the terminal device according to the first instruction information after the time for which the network side device and the terminal device are in the connected state is the preset connection holding time t. If the first instruction information instructs the network side device to skip releasing the connection between the network side device and the terminal device when a time of receiving the uplink data sent by the terminal device is within a preset connection holding time, the network side device releases the connection between the network side device and the terminal device according to the first instruction information after the time of receiving the uplink data is the preset connection holding time.

Step 405: The network side device sends first configuration information to the terminal device, where the first configuration information includes the foregoing preset connection holding time t, and in this way, the network side device actively releases the connection between the network side device and the terminal device after the time for which the network side device is connected to the terminal device is the preset connection holding time t. In addition to sending the first configuration information to the terminal device when the terminal device is in the connected state or in the power-on and registering process of the terminal device, the network side device may also send, when the terminal device is in the second non-activated state and listens to the paging message, the first configuration information to the terminal device by using a broadcast message.

Step 406: The network side device sends second configuration information to the terminal device, where the second configuration information includes: a time point at which the terminal device listens to the paging message and the preset first listening time; the preset first listening time; a time point at which the terminal device listens to the paging message and the preset first quantity of listening times; or the preset first quantity of listening times. Specifically, the network side device may send, when the terminal device is in the connected state, the second configuration information by using a user plane or a data plane; or the network side device sends the second configuration information to the terminal device in the power-on and registering process of the terminal device. In addition, the second configuration information may be added to a new message or added to an existing message used for communication between the network side device and the terminal device, so as to be sent to the terminal device.

The foregoing steps 403 to 405 are respectively three substeps for performing data transmission by the network side device, where step 404 and step 405 have no absolute sequence relationship, and may be executed at the same time or may be executed subsequently, and FIG. 5 shows only one of specific implementation manners.

Method Embodiment 5 of the Present Invention

Figure 7:
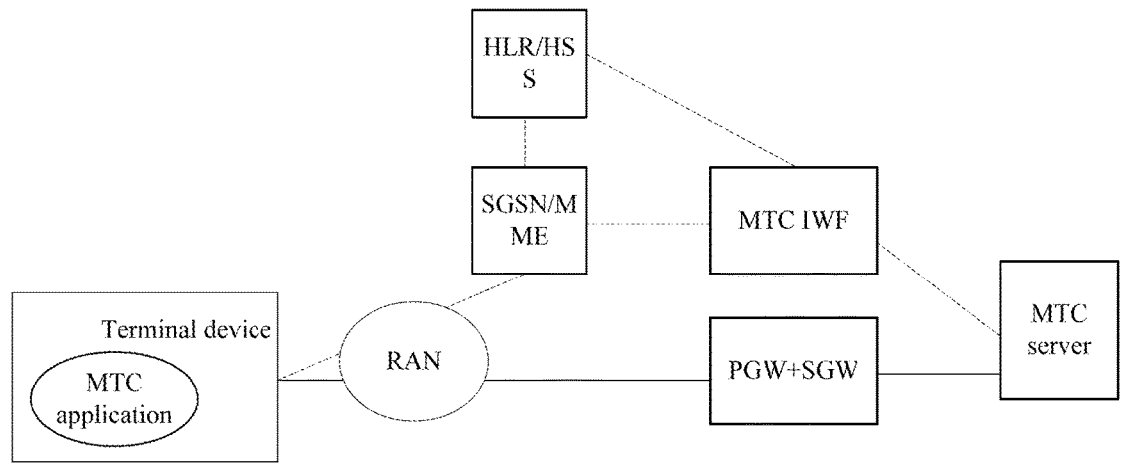
FIG. 7 is a schematic structural diagram of the Internet of Things to which a method according to an embodiment of the present invention is specifically applied.

A data transmission method is mainly applied to an Internet of Things system shown in FIG. 7, where the system includes devices such as a terminal device with a machine-type communication (MTC) application, a radio access network (RAN), a mobile management entity (MME) or a serving GPRS support node (SGSN), a home location register (HLR) or a home subscriber server (HSS), an MTC interworking function (IWF) entity, a service gateway (SGW) and a packet data gateway (PGW), and an MTC server. In FIG. 7, a solid line represents data transmission on a data plane, and a dotted line represents data transmission on a control plane. The Internet of Things system may perform data transmission according to the following two methods:

(1) The terminal device is switched between a first non-activated state and a connected state.

When the terminal device is in a power-on and registering process, that is, an attach procedure, and in a procedure of authentication performed by a network side on the terminal device, the terminal device informs the MME that a type of the terminal device is a terminal device that is switched between the first non-activated state and the connected state; the MME performs authentication on the terminal device by using subscription information of the terminal device, and the MME may record the type of the terminal device in a context of the terminal device after the authentication succeeds; the MME adds the type of the terminal device to a Create Session Request message that is sent to the SGW, and then the SGW stores the type of the terminal device in the context of the terminal device.

After the terminal device is powered on and registers with the network side, the terminal device may be in two states, namely, the first non-activated state or the connected state, and specifically, when the terminal device does not need to send uplink data, the terminal device is set to be in the first non-activated state and does not listen to a paging message. In this case, when downlink data of the terminal device reaches the SGW, the SGW no longer triggers sending of a downlink data notification (downlink data notification) message to the MME, but buffers the downlink data.

When the terminal device needs to send uplink data, the terminal device is set to be in the connected state, a SIB message is first acquired, and a value tag in the SIB message is compared with a value stored in the terminal device, where if the value tag in the SIB message is inconsistent with the value stored in the terminal device, system information stored in the terminal device needs to be updated; if the terminal device moves in the first non-activated state, but does not execute a location updating operation, the terminal device needs to update a latest location to the network side. After the foregoing operation is executed, the terminal device may send the uplink data according to updated system information, and the SGW may send the buffered downlink data to the terminal device.

In a process in which the terminal device is in the connected state, second instruction information may further be sent to a base station, to instruct the base station to release a connection, and the base station releases a connection between the base station and the terminal device after receiving the second instruction information. In the process in which the terminal device is in the connected state, first instruction information may be sent to a base station in the RAN, where the first instruction information includes a connection holding time t that is fixedly set in the terminal device; in this way, after receiving the first instruction information, the base station starts a timer and sets a time of the timer to the connection holding time t, and the base station releases a connection between the base station and the terminal device after the timer is stopped. In another specific embodiment, the connection holding time t is not fixedly set in the terminal device, and in this way, an MME or the like on an uplink network may carry the connection holding time t to the terminal device by using a message that is in an Attach procedure, an authentication procedure or a secure interaction procedure or a new message, and the terminal device releases a connection after a time for which the terminal device has been in the connected state is the connection holding time t.

The MME may further send the foregoing connection holding time t to the base station by using an initial context setup request (initial context setup request) message that is in the Attach procedure, a service request (service request) procedure or a switching process or a new message, and if after receiving the connection holding time t, the base station is currently in a connected state in which the base station is connected to the terminal device, the base station starts a timer whose time is t; if there is no session connection between the base station and the terminal device currently, the base station starts the foregoing timer after receiving the first uplink data package or the last uplink data package of the terminal device. After the timer expires, the base station releases the connection between the base station and the terminal device.

It should be noted that, in the foregoing embodiment, a type of the terminal device, that is, a terminal device that is switched between the first non-activated state and the connected state may be sent to a network side device by the terminal device; in another embodiment, the network side device knows the type of the terminal device, and in this way, the terminal device does not need to send the type to the network side device, and the network side device actively buffers downlink data of the terminal device when the terminal device is in the first non-activated state.

(2) The terminal device is switched between a second non-activated state and a connected state, and in the second non-activated state, the terminal device listens to a paging message within a first listening time.

In a power-on and registering process, the terminal device informs a network side device that a type of the terminal device is a terminal device that is switched between the second non-activated state and the connected state, a specific process is similar to that of the foregoing case in which the terminal device is switched between the first non-activated state and the connected state, and details are not repeatedly described herein. In another case, the network side device knows the type of the terminal device, and may actively buffer, when the terminal device is in the second non-activated state, downlink data provided that a preset second listening time t2 is exceeded.

After the terminal device is powered on and registers with a network side, the terminal device may be in two states, namely, the second non-activated state or the connected state, and specifically, when the terminal device does not need to send uplink data, the terminal device is set to be in the second non-activated state, that is, listens to a paging message within a first listening time t1 and does not listen to a paging message when the first listening time t1 is exceeded. In this case, after the SGW receives a release access bearers request (release access bearers request) sent by the MME, where the release access bearers request may instruct the terminal device to enter the second non-activated state, the SGW may start a timer whose time is the second listening time t2, and when downlink data of the terminal device reaches the SGW, the SGW may trigger, within the second listening time t2, sending of a downlink data notification (downlink data notification) message to the MME; if the timer expires, the SGW does not trigger the sending of the downlink data notification but buffers the downlink data.

When the terminal device needs to send uplink data, the terminal device enters the connected state, and an operation executed by the terminal device is similar to the operation of entering, by the terminal device, the connected state from the first non-activated state, and details are not repeatedly described herein. In the connected state, the terminal device may send the uplink data, and if the SGW has buffered the downlink data, the SGW may send the buffered downlink data to the terminal device. In a process in which the terminal device is in the connected state, the terminal device may further send second instruction information to a base station, to release a connection, or may send first instruction information to a base station to require the base station to hold a connection between the base station and the terminal device.

In another specific embodiment, the foregoing connection holding time t and the first listening time t1 are not fixedly set in the terminal device, and in this way, an MME or the like on an uplink network may carry the connection holding time t and the first listening time t1 to the terminal device by using a message that is in an Attach procedure, an authentication procedure, or a secure interaction procedure or a new message; the MME may add the second listening time t2 and the connection holding time t to a session recreation request that is sent to the SGW. In this embodiment, because in the second non-activated state, the terminal device listens to a paging message for a period of time, the MME may send the foregoing connection holding time t and the first listening time t1 to the terminal device by using a broadcast message.

It should be noted that, because in some embodiments, an application apparatus and a communication apparatus in a terminal device are separate entities, when the terminal device is in the connected state, the MTC server may directly inform the application apparatus of the terminal device of the foregoing connection holding time t and the first listening time t1 by using a data plane, and in this way, the application apparatus instructs, by using an API interface, the communication apparatus to listen to the paging message according to the first listening time t1; or the MTC server informs the terminal device of the configuration information by using a control plane, and in this case, the MTC server sends the configuration information to the MME, and the MME configures the configuration information for the terminal device. In addition, the MTC server may also configure, for the terminal device, a time point at which the terminal device listens to the paging message.

(3) The terminal device is switched between a second non-activated state and a connected state, and in the second non-activated state, the terminal device listens to a paging message according to a first quantity of listening times, which is similar to the method in which the terminal device listens to the paging message according to the first listening time in the second non-activated state, but a difference is that, the terminal device listens to a paging message according to a first quantity of listening times N1, while a network side device, for example, an SGW, buffers downlink data provided that a quantity of times for which the terminal device listens to a paging message exceeds a second quantity of listening times N2. Therefore, in the SGW, to determine whether downlink data needs to be buffered, a timer is not started, but a counter used to count listening times of the terminal device is started. When a value of the counter reaches the second quantity of listening times N2, if the terminal device is still in the second non-activated state, the downlink data is buffered.

Device Embodiment 1 of the Present Invention

Figure 8:
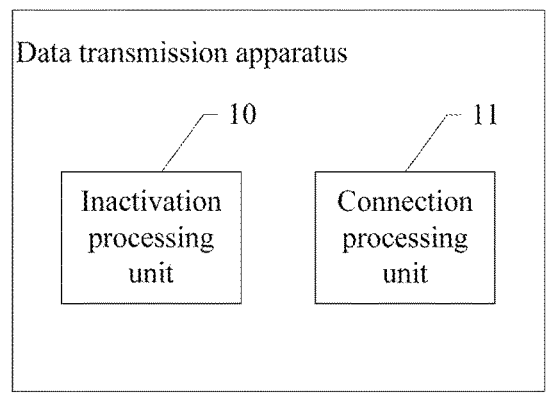
FIG. 8 is a schematic structural diagram of a data transmission apparatus according to Device Embodiment 1 of the present invention.

A data transmission apparatus, for example, a terminal device, is provided and is mainly configured to execute the method described in Method Embodiment 1 or 3, and a schematic structural diagram is shown in FIG. 8. The apparatus includes an inactivation processing unit 10 and a connection processing unit 11.

The inactivation processing unit 10 is configured to set, when uplink data does not need to be sent, the data transmission apparatus to be in a first non-activated state or a second non-activated state, where when the data transmission apparatus is in the first non-activated state, the inactivation processing unit 10 does not listen to a paging message; and when the data transmission apparatus is in the second non-activated state, the inactivation processing unit 10 listens to a paging message within a preset first listening time or a preset first quantity of listening times, and does not listen to a paging message when the first listening time or the first quantity of listening times is exceeded.

The connection processing unit 11 is configured to: set, when uplink data needs to be sent, the data transmission apparatus to be in a connected state; send, if system information needs to be updated, the uplink data after updating the system information; and receive downlink data that is buffered by a network side device when the data transmission apparatus is in the first non-activated state or the second non-activated state, where specifically, the connection processing unit 11 needs to send the uplink data and receive the downlink data according to updated system information.

Further, if the data transmission apparatus moves in the first non-activated state or the second non-activated state, the foregoing inactivation processing unit 10 may further update a new location to a network side; if the inactivation processing state 10 does not perform location updating, the connection processing unit 11 may further first determine whether location updating needs to be performed, and if the location updating needs to be performed, the connection processing unit 11 further needs to perform location updating.

In a data transmission apparatus in this embodiment of the present invention, when no uplink data is sent, an inactivation processing unit 10 sets the data transmission apparatus to be in a first non-activated state, and in this way, the data transmission apparatus does not listen to a paging message, nor constantly enter a connected state from the first non-activated state to receive downlink data; or when uplink data is sent, an inactivation processing unit 10 sets the data transmission apparatus to be in a second non-activated state, and in this way, the data transmission apparatus listens to a paging message in a period of time, so that the data transmission apparatus enters a connected state from the second non-activated state in the period of time, to receive downlink data, and in a process in which the inactivation processing unit 10 does not listen to a paging message, the data transmission apparatus does not enter the connected state from the second non-activated state to receive downlink data, which reduces times of switching between the non-activated state and the connected state and can reduce power dissipation of the data transmission apparatus in this embodiment, thereby reducing power consumption; in addition, a connection processing unit 11 sets the data transmission apparatus to be in the connected state only when the uplink data is sent, which can fully ensure that the data transmission apparatus transmits the uplink data and receives the downlink data, thereby ensuring uplink and downlink services.

Figure 9:
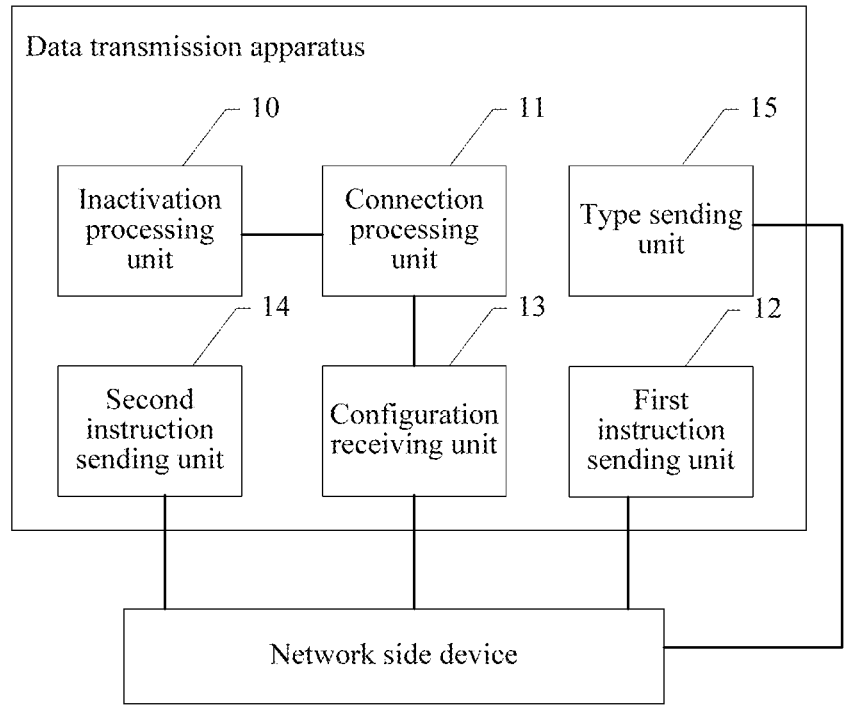
FIG. 9 is a schematic structural diagram of another data transmission apparatus according to Device Embodiment 1 of the present invention.

As shown in FIG. 9, in a specific embodiment, in addition to a structure shown in FIG. 8, the data transmission apparatus may further include: a first instruction sending unit 12, a configuration receiving unit 13, a second instruction sending unit 14, and a type sending unit 15.

The first instruction sending unit 12 is configured to send first instruction information to the network side device, where the first instruction information is used to instruct the network side device to skip releasing a connection between the network side device and the data transmission apparatus when a time for which the network side device and the data transmission apparatus are in the connected state is within a preset connection holding time; or instruct the network side device to skip releasing a connection between the network side device and the data transmission apparatus when a time of receiving the uplink data sent by the data transmission apparatus is within the preset connection holding time.

The configuration receiving unit 13 is configured to receive first configuration information sent by the network side device, where the first configuration information includes the preset connection holding time. If the data transmission apparatus is switched between the second non-activated state and the connected state, the configuration receiving unit 13 may further receive second configuration information sent by the network side device, where the second configuration information includes: a time point for listening to the paging message and the preset first listening time; the preset first listening time; a time point for listening to the paging message and the preset first quantity of listening times; or the preset first quantity of listening times. In this case, in the second non-activated state, the inactivation processing unit 10 may listen to the paging message according to information configured in the second configuration information received by the configuration receive unit 13.

The second instruction sending unit 14 is configured to send, when the data transmission apparatus is in the connected state, second instruction information to the network side device, where the second instruction information is used to instruct the network side device to release the connection between the network side device and the data transmission apparatus.

The type sending unit 15 is configured to send a type of the data transmission apparatus to the network side device if the data transmission apparatus is switched between the first non-activated state and the connected state, so that the network side device buffers the downlink data according to the type of the data transmission apparatus when the data transmission apparatus is in the first non-activated state, where the type of the data transmission apparatus is an apparatus that is switched between the first non-activated state and the connected state.

In another embodiment, if the data transmission apparatus is switched between the second non-activated state and the connected state, the type sending unit 15 may further be configured to send a type of the data transmission apparatus to the network side device, so that the network side device buffers the downlink data according to the type of the data transmission apparatus when the data transmission apparatus is in the second non-activated state and does not listen to the paging message, where the type of the data transmission apparatus is an apparatus that is switched between the second non-activated state and the connected state.

In the data transmission apparatus in this embodiment, when the connection processing unit 11 sends the uplink data but does not receive downlink data, or after the connection processing 11 receives a connection release message sent by the network side device, the connection processing unit 11 is further configured to trigger the inactivation processing unit 10 to set the data transmission apparatus to be in the first non-activated state or the second non-activated state, and in this case, the second instruction sending unit 14 may further send the second instruction information to the network side device, to instruct the network side device to release the connection between the network side device and the data transmission apparatus.

In another case, when the connection processing unit 11 has set the data transmission apparatus to be in the connected state for the preset connection holding time, or when the connection processing unit 11 sends the uplink data and holds for the preset connection holding time, the connection processing unit 11 is further configured to trigger the inactivation processing unit 10 to set the data transmission apparatus to be in the first non-activated state or the second non-activated state, where the preset connection holding time may be a configuration sent by the network side device and received by the configuration receiving unit 13, and in this way, the connection processing unit 11 holds the connection according to the first configuration information received by the configuration receiving unit 13; or the preset connection holding time may be in the data transmission apparatus, and the first instruction sending unit 12 may send the first instruction information to the network side device, to instruct the network side to hold the connection.

Device Embodiment 2 of the Present Invention

Figure 10:
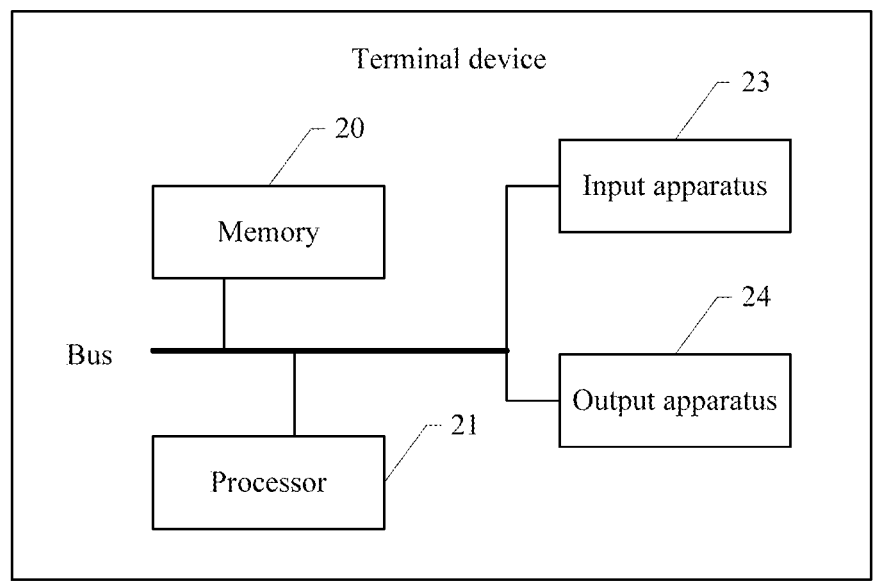
FIG. 10 is a schematic structural diagram of a terminal device according to Device Embodiment 2 of the present invention.

A schematic structural diagram of a terminal device is shown in FIG. 10, and the terminal device includes a memory 20, a processor 21, an input apparatus 23, and an output apparatus 24 that are separately connected to a bus, where data transmission may be performed between the apparatuses according to the data transmission method described in Method Embodiment 1 or 3.

The memory 20 is configured to store data input from the input apparatus 23, and may further store information such as a file that is required by the processor 21 for processing data.

The input apparatus 23 and the output apparatus 24 are ports through which a network side device communicates with another device, and may further include an external output device of the network side device, such as a display, a keyboard, a mouse, or a printer. Specifically, the input apparatus 23 may include a mouse, a keyboard, and the like, and the output apparatus 24 includes a display and the like.

The processor 21 is configured to: set, when uplink data does not need to be sent, the terminal device to be in a first non-activated state or a second non-activated state, where in the first non-activated state, the terminal device does not listen to a paging message, and in the second non-activated state, the terminal device listens to a paging message within a preset first listening time or a preset first quantity of listening times, and does not listen to a paging message when the first listening time or the first quantity of listening times is exceeded; or set, when uplink data needs to be sent, the terminal device to be in a connected state, and if system information needs to be updated, control the output apparatus 24 to send the uplink data after updating the system information; the input apparatus 23 is configured to receive, when the terminal device is in the connected state, downlink data that is buffered by the network side device when the terminal device is in the first non-activated state or the second non-activated state. Further, if the terminal device moves in the first non-activated state or the second non-activated state, but the processor 21 does not update a new location to the network side device, after the terminal device is set to be in the connected state, the processor 21 further needs to perform a location updating operation.

Further, when the output apparatus 24 sends the uplink data but does not receive the downlink data, or after the input apparatus 23 receives a connection release message sent by the network side device, the processor 21 may set the terminal device to be in the first non-activated state or the second non-activated state, and in this case, when the terminal device is in the connected state, the processor 21 may further control the output apparatus 24 to send second instruction information to the network side device, where the second instruction information is used to instruct the network side device to release a connection between the network side device and the terminal device.

In another case, after the terminal device has been in the connected state for a preset connection holding time or after the output apparatus 24 sends the uplink data and holds for a preset connection holding time, the processor 21 may set the terminal device to be in the first non-activated state or the second non-activated state. The preset connection holding time may be included in first configuration information sent by the network side device and received by the input apparatus 23; or the preset connection holding time is fixedly set in the terminal device, and in this way, the processor 21 may control the output apparatus 24 to send first instruction information to the network side device, where the first instruction information is used to instruct the network side device to skip releasing the connection between the network side device and the terminal device when a time for which the network side device and the terminal device are in the connected state is within the preset connection holding time.

Further, when the terminal device is switched between the second non-activated state and the connected state, the processor 21 is further configured to receive second configuration information sent by the network side device, where the second configuration information includes: a time point for listening to the paging message and the preset first listening time; the preset first listening time; a time point for listening to the paging message and the preset first quantity of listening times; or the preset first quantity of listening times; in this way, the processor 21 listens, when the terminal device is in the second non-activated state, to the paging message according to information configured in the second configuration information received by the processor 21. In this case, data transmission may be performed between units in the terminal device according to the method described in Method Embodiment 3, and the processor 21 may further control the output apparatus 24 to send a type of the terminal device to the network side device, where the type of the terminal device is a terminal device that is switched between the second non-activated state and the connected state, so that the network side device buffers the downlink data according to the type of the terminal device when the terminal device is in the second non-activated state and does not listen to the paging message.

In another case, if the terminal device is switched between the first non-activated state and the connected state, data transmission may be performed between units of the terminal device according to the method described in Method Embodiment 1, and the processor 20 may control the output apparatus 24 to send a type of the terminal device to the network side device, where the type of the terminal device is a terminal device that is switched between the first non-activated state and the connected state, so that the network side device buffers the downlink data according to the type of the terminal device when the terminal device is in the first non-activated state.

It should be noted that, the terminal device in this embodiment is a case in which an application apparatus and a communication apparatus are included in a same entity. Specifically, the input apparatus 23 and the output apparatus 24 in the terminal device belong to the part of the communication apparatus, and the processor 21 and the memory 20 belong to the part of the application apparatus. In some cases, an application apparatus (such as an electricity meter) and a communication apparatus that are included in a terminal device may be separate entities. In this case, the application apparatus and the communication apparatus may be connected by using a communication interface, for example, an application programming interface (Application Programming Interface, API); if the application apparatus needs to upload a running status of the application apparatus, for example information such as a number counted by the electricity meter, the application apparatus uses the data as uplink data and first transmits the data to the communication apparatus; a structure of the communication apparatus may be similar to a structure of the terminal device shown in FIG. 6 in this embodiment, and the communication apparatus may send the uplink data to the network side device according to the method described in Method Embodiment 1 or 3.

Device Embodiment 3 of the Present Invention

Figure 11:
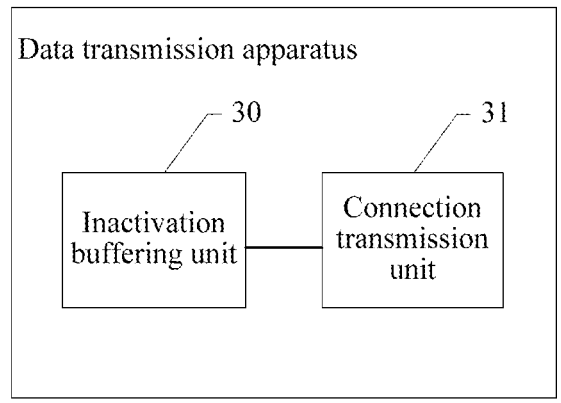
FIG. 11 is a schematic structural diagram of a data transmission apparatus according to Device Embodiment 3 of the present invention.

A data transmission apparatus, for example, a network side device, is provided, where units in the data transmission apparatus may perform data transmission according to the method described in Method Embodiment 2 or 4, a schematic structural diagram of the data transmission apparatus is shown in FIG. 11, and the data transmission apparatus includes an inactivation buffering unit 30 and connection transmission unit 31.

The inactivation buffering unit 30 is configured to buffer downlink data of a terminal device when the terminal device is in a first non-activated state, where in the first non-activated state, the terminal device does not listen to a paging message; or the inactivation buffering unit 30, configured to buffer, when a terminal device is in a second non-activated state, downlink data of the terminal device when a preset second listening time or a preset second quantity of listening times for which the terminal device listens to a paging message is exceeded, where in the second non-activated state, the terminal device listens to a paging message within a preset first listening time or a preset first quantity of listening times, and does not listen to a paging message when the first listening time or the first quantity of listening times is exceeded.

The connection transmission unit 31 is configured to receive, when the terminal device enters a connected state in which the terminal device is connected to the data transmission apparatus, uplink data sent by the terminal device, and send, to the terminal device, the downlink data that is buffered by the inactivation buffering unit 30 when the terminal device is in the first non-activated state or the second non-activated state.

It may be seen that, if when a terminal device does not send uplink data, the terminal device is set to be in a first non-activated state, that is, does not listen to a paging message, or a terminal device is set to be in a second non-activated state, where in the second non-activated state, a paging message is listened to only within a first listening time or a first quantity of listening times, and in this way, the terminal device does not constantly enter a connected state from the first non-activated state to receive downlink data, or enters a connected state from the second non-activated state only in a period of time to receive downlink data, which reduces times of switching between the non-activated state and the connected state and can reduce power dissipation of the terminal device, thereby reducing power consumption; in addition, an inactivation buffering unit 30 in the data transmission apparatus in this embodiment needs to buffer the downlink data first, and the terminal device is set to be in the connected state if the terminal device sends the uplink data, which can fully ensure that the terminal device transmits the uplink data and receives the downlink data transmitted by a connection transmission unit 31 that is in the data transmission apparatus, thereby ensuring uplink and downlink services.

Figure 12:
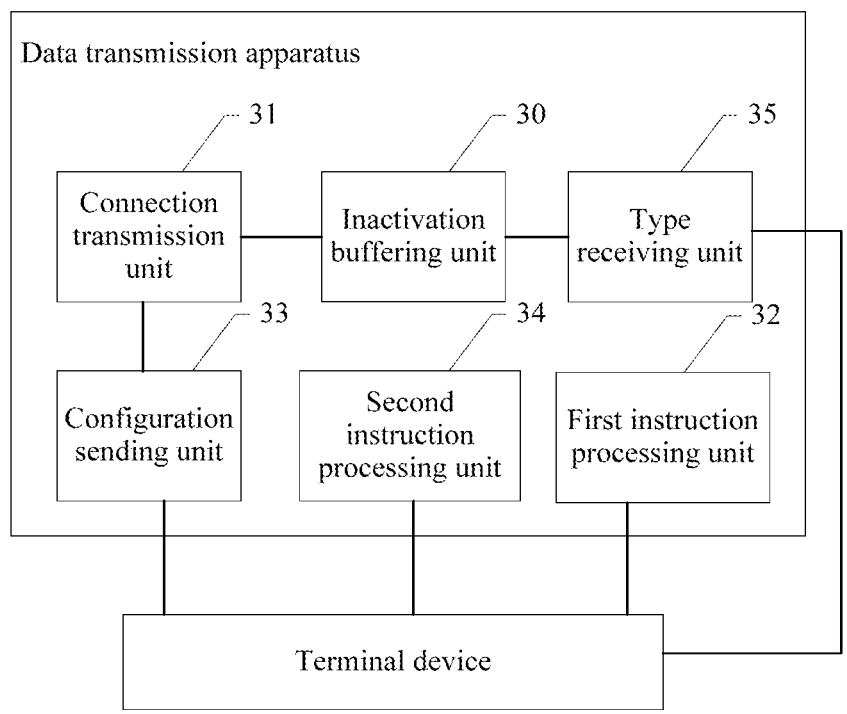
FIG. 12 is a schematic structural diagram of another data transmission apparatus according to Device Embodiment 3 of the present invention.

As shown in FIG. 12, in a specific embodiment, in addition to a structure shown in FIG. 11, the data transmission apparatus may further include: a first instruction processing unit 32, a configuration sending unit 33, a second instruction processing unit 34, and a type receiving unit 35.

The first instruction processing unit 32 is configured to: receive first instruction information sent by the terminal device; and if the first instruction information is used to instruct the data transmission apparatus to skip releasing a connection between the data transmission apparatus and the terminal device when a time for which the data transmission apparatus and the terminal device are in the connected state is within a preset connection holding time, release the connection between the data transmission apparatus and the terminal device according to the first instruction information after the time for which the data transmission apparatus and the terminal device are in the connected state is the preset connection holding time; or if the first instruction information instructs the data transmission apparatus to skip releasing a connection between the data transmission apparatus and the terminal device when a time for the data transmission apparatus to receive the uplink data sent by the terminal device is within the preset connection holding time, release the connection between the data transmission apparatus and the terminal device according to the first instruction information after the time for the data transmission apparatus to receive the uplink data is the preset connection holding time.

The configuration sending unit 33 is configured to send first configuration information to the terminal device, where the first configuration information includes the preset connection holding time. If the inactivation buffering unit 30 buffers the downlink data of the terminal device when the preset second listening time or the preset second quantity of listening times is exceeded, the configuration sending unit 33 may further send second configuration information to the terminal device, where the second configuration information includes: a time point at which the terminal device listens to the paging message and the preset first listening time; the preset first listening time; a time point at which the terminal device listens to the paging message and the preset first quantity of listening times; or the preset first quantity of listening times.

The second instruction processing unit 34 is configured to: receive, when the terminal device is in the connected state, second instruction information sent by the terminal device, where the second instruction information is used to instruct the data transmission apparatus to release the connection between the data transmission apparatus and the terminal device; and release the connection between the data transmission apparatus and the terminal device according to the second instruction information.

The type receiving unit 35 is configured to receive a type of the terminal device sent by the terminal device.

In the data transmission apparatus in this embodiment, the type receiving unit 35 may receive the type of the terminal device sent by the terminal device. If the type is a terminal device that is switched between the first non-activated state and the connected state, the inactivation buffering unit 30 buffers the downlink data of the terminal device when the terminal device is in the first non-activated state. If the type is a terminal device that is switched between the second non-activated state and the connected state, the inactivation buffering unit 31 buffers the downlink data of the terminal device when the preset second listening time or the preset second quantity of listening times is exceeded.

When the uplink data and the downlink data are transmitted between the connection transmission unit 31 and the terminal device, if the second instruction processing unit 33 receives the second instruction information, may release the connection between the data transmission apparatus and the terminal device; in addition, the connection transmission unit 31 may actively hold the connection between the data transmission apparatus and the terminal device according to the connection holding time that is sent to the terminal device by the configuration sending unit 33, and the connection transmission unit 31 may further passively hold the connection between the data transmission apparatus and the terminal device according to the first instruction information received by the first instruction processing unit 32.

Device Embodiment 4 of the Present Invention

Figure 13:
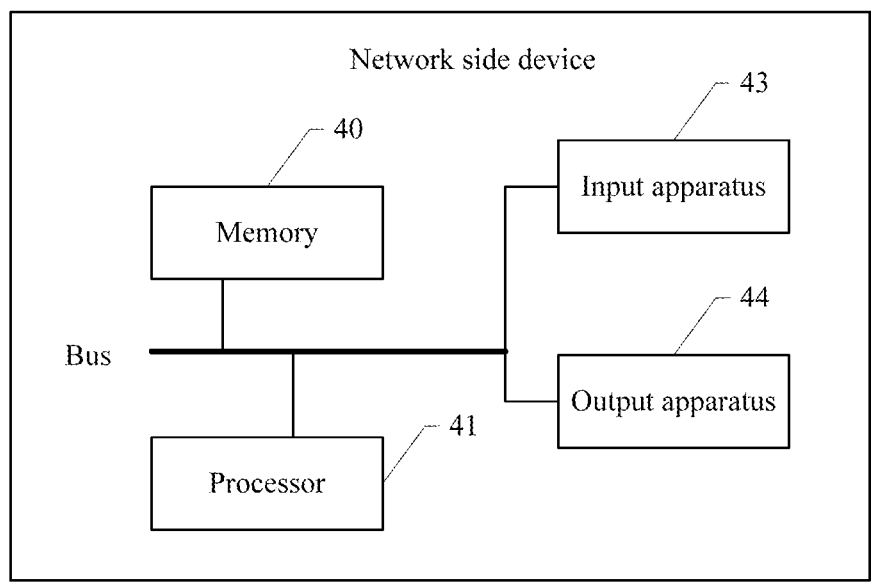
FIG. 13 is a schematic structural diagram of a network side device according to Device Embodiment 4 of the present invention.

A schematic structural diagram of a network side device is shown in FIG. 13, and the network side device includes a memory 40, a processor 41, an input apparatus 43, and an output apparatus 44 that are separately connected to a bus, where data transmission may be performed between the apparatuses according to the data transmission method described in Method Embodiment 2 or 4.

The memory 40 is configured to store data input from the input apparatus 43, and may further store information such as a file that is required by the processor 41 for processing data.

The input apparatus 43 and the output apparatus 44 are ports through which the network side device communicates with another device, and may further include an external output device of the network side device, such as a display, a keyboard, a mouse, or a printer. Specifically, the input apparatus 43 may include a mouse, a keyboard, and the like, and the output apparatus 44 includes a display and the like.

The processor 41 in this embodiment is configured to: buffer downlink data of a terminal device when the terminal device is in a first non-activated state, where in the first non-activated state, the terminal device does not listen to a paging message; or the processor 41 is configured to buffer, when a terminal device is in a second non-activated state, downlink data of the terminal device when a preset second listening time or a preset second quantity of listening times for which the terminal device listens to a paging message is exceeded, where in the second non-activated state, the terminal device listens to a paging message within a preset first listening time or a preset first quantity of listening times, and does not listen to a paging message when the first listening time or the first quantity of listening times is exceeded; when the terminal device enters a connected state in which the terminal device is connected to the network side device, the input apparatus 43 is configured to receive uplink data sent by the terminal device, and the processor 41 may control the output apparatus 44 to send, to the terminal device, the downlink data that is buffered by the processor 41 when the terminal device is in the first non-activated state or the second non-activated state.

When the processor 41 controls the input apparatus 43 and the output apparatus 44 to transmit data with the terminal device, that is, the terminal device is in the connected state, after the input apparatus 43 receives second instruction information sent by the terminal device, if the second instruction information is used to instruct the network side device to release a connection between the network side device and the terminal device, the processor 41 releases the connection between the network side device and the terminal device according to the second instruction information.

In another case, if the input apparatus 43 receives first instruction information sent by the terminal device, and if the first instruction information is used to instruct the network side device to skip releasing the connection between the network side device and the terminal device when a time for which the network side device and the terminal device are in the connected state is within a preset connection holding time, the processor 41 releases the connection between the network side device and the terminal device according to the first instruction information after the time for which the network side device and the terminal device are in the connected state is the preset connection holding time. If the first instruction information instructs the network side device to skip releasing the connection between the data transmission apparatus and the terminal device when a time for the data transmission apparatus to receive the uplink data sent by the terminal device is within the preset connection holding time, the processor 41 releases the connection between the data transmission apparatus and the terminal device according to the first instruction information after the time for the data transmission apparatus to receive the uplink data is the preset connection holding time. Alternatively, the foregoing preset connection holding time is configured for the terminal device by the network side device, and the processor 41 may control the output apparatus 44 to send first configuration information to the terminal device, where the first configuration information includes the preset connection holding time.

Further, the network side device in this embodiment of the present invention does not perform data transmission on all terminal devices according to the foregoing method in Method Embodiment 2 or 4, and further including: the processor 41, the memory 40, the input apparatus 43, and the output apparatus 44 that are in the network side device perform data transmission according to the foregoing method in Method Embodiment 2 provided that a type of the terminal device sent by the terminal device and received by the input apparatus 43 is a terminal device that is switched between the first non-activated state and the connected state.

If the type of the terminal device sent by the terminal device and received by the input apparatus 43 is a terminal device that is switched between the second non-activated state and the connected state, the processor 41, the memory 40, the input apparatus 43, and the output apparatus 44 that are in the network side device perform data transmission according to the foregoing method in Method Embodiment 4. In this case, when the processor 41 buffers the downlink data of the terminal device when the preset second listening time or the preset second quantity of listening times is exceeded, the processor 41 may further control the output apparatus 44 to send second configuration information to the terminal device, where the second configuration information includes: a time point at which the terminal device listens to the paging message and the preset first listening time; the preset first listening time; a time point at which the terminal device listens to the paging message and the preset first quantity of listening times; or the preset first quantity of listening times.

An embodiment of the present invention further provides a data transmission system which may include the network side device shown in FIG. 10 and the terminal device shown in FIG. 13.

Another data transmission system includes a network side device and a terminal device, where a structure of the terminal device may be the data transmission apparatus shown in FIG. 8, and a structure of the network side device may be the data transmission apparatus shown in FIG. 11; or a structure of the terminal device may be the data transmission apparatus shown in FIG. 9, and a structure of the network side device may be the data transmission apparatus shown in FIG. 12, and details are not repeatedly described herein.

A person of ordinary skill in the art may understand that all or some of the steps of the methods in the embodiments may be implemented by a program instructing relevant hardware. The program may be stored in a computer readable storage medium. The storage medium may include: a read-only memory (ROM), a random-access memory (RAM), a magnetic disk, or an optical disc.

The foregoing describes the data transmission method, system, and related device that are provided in the embodiments of the present invention in detail, where network nodes include user equipment and a server. Although the principle and implementation manners of the present invention are described with reference to specific examples, the above embodiments are only intended to help understand the method and core idea of the present invention. In addition, with respect to the specific implementation manners and application scope of the present invention, modifications and variations may be made by a person of ordinary skill in the art according to the idea of the present invention. Therefore, the specification shall not be construed as a limitation on the present invention.

What is claimed is:

1. A data transmission method, applied to a terminal device, wherein the method comprises:
   while the terminal device does not need to send uplink data,
      setting the terminal device to be in a first non-activated state or a second non-activated state, wherein the first non-activated state and the second non-activated state are not connected states, wherein in the first non-activated state, the terminal device does not listen to a paging message, and wherein in the second non-activated state, the terminal device listens to a paging message within a first preset listening time or a first preset quantity of listening times, and does not listen to a paging message when the first listening time or the first quantity of listening times is exceeded; and
   while the terminal device needs to send uplink data,
      setting the terminal device to be in a connected state from the first non-activated state or the second non-activated state;
      sending, by the terminal device, the uplink data after updating system information; and
      receiving downlink data that is buffered by a network side device while the terminal device is in the first non-activated state or the second non-activated state.

2. The method according to claim 1, wherein the method further comprises:
   after receiving a connection release message sent by the network side device, entering, by the terminal device, the first non-activated state or the second non-activated state; or
   after sending the uplink data and when not receiving the downlink data, entering, by the terminal device, the first non-activated state or the second non-activated state; or
   after sending the uplink data and holding for a preset connection holding time, entering, by the terminal device, the first non-activated state or the second non-activated state; or
   after the terminal device has been in the connected state for a preset connection holding time, entering, by the terminal device, the first non-activated state or the second non-activated state.

3. The method according to claim 2, wherein the method further comprises:
   sending, by the terminal device, first instruction information to the network side device, wherein the first instruction information is used to:
      instruct the network side device to skip releasing a connection between the network side device and the terminal device when a time for which the network side device and the terminal device are in the connected state is within the preset connection holding time; or
      instruct the network side device to skip releasing a connection between the network side device and the terminal device when a time of receiving the uplink data sent by the terminal device is within the preset connection holding time; or
   receiving, by the terminal device, first configuration information sent by the network side device, wherein the first configuration information comprises the preset connection holding time.

4. The method according to claim 1, wherein the method further comprises:
when the terminal device is in the connected state, sending, by the terminal device, second instruction information to the network side device, wherein the second instruction information is used to instruct the network side device to release a connection between the network side device and the terminal device.

5. The method according to claim 1, wherein when the terminal device is switched between the second non-activated state and the connected state, the method further comprises:
receiving, by the terminal device, second configuration information sent by the network side device, wherein the second configuration information comprises: a time point for listening to the paging message and the first preset listening time; the first preset listening time; a time point for listening to the paging message and the first preset quantity of listening times; or the first preset quantity of listening times.

6. The method according to claim 1, wherein the method further comprises:
sending, by the terminal device, a type of the terminal device to the network side device if the terminal device is switched between the first non-activated state and the connected state, so that the network side device buffers the downlink data according to the type of the terminal device when the terminal device is in the first non-activated state, wherein the terminal device is a type of the terminal device that is switched between the first non-activated state and the connected state; or
sending, by the terminal device, a type of the terminal device to the network side device if the terminal device is switched between the second non-activated state and the connected state, so that the network side device buffers the downlink data according to the type of the terminal device when the terminal device is in the second non-activated state and does not listen to the paging message, wherein the terminal device is a type of the terminal device that is switched between the second non-activated state and the connected state.

7. A data transmission method, applied to a network side device, wherein the method comprises:
buffering, by the network side device, downlink data of a terminal device in response to the terminal device being in a first non-activated state, wherein in the first non-activated state, the terminal device does not listen to a paging message; and
in response to the terminal device being in a second non-activated state, buffering, by the network side device, downlink data of the terminal device when a second preset listening time or a second preset quantity of listening times for which the terminal device listens to a paging message is exceeded, wherein in the second non-activated state, the terminal device listens to a paging message within a first preset listening time or a first preset quantity of listening times, and does not listen to a paging message when the first listening time or the first quantity of listening times is exceeded, wherein the first non-activated state and the second non-activated state are not connected states; and
in response to the terminal device entering a connected state in which the terminal device is connected to the network side device, receiving, by the network side device, uplink data sent by the terminal device, and sending, to the terminal device, the downlink data that is buffered when the terminal device is in the first non-activated state or the second non-activated state.

8. The method according to claim 7, wherein the method further comprises:
receiving, by the network side device, first instruction information sent by the terminal device; and if the first instruction information is used to instruct the network side device to skip releasing a connection between the network side device and the terminal device when a time for which the network side device and the terminal device are in the connected state is within a preset connection holding time, releasing, by the network side device, the connection between the network side device and the terminal device according to the first instruction information after the time for which the network side device and the terminal device are in the connected state is the preset connection holding time.

9. The method according to claim 7, wherein the method further comprises:
when the terminal device is in the connected state, receiving, by the network side device, second instruction information sent by the terminal device, wherein the second instruction information is used to instruct the network side device to release the connection between the network side device and the terminal device; and releasing, by the network side device, the connection between the network side device and the terminal device according to the second instruction information.

10. The method according to claim 7, wherein if the network side device buffers the downlink data of the terminal device when the second preset listening time or the second preset quantity of listening times is exceeded, the method further comprises:
sending, by the network side device, second configuration information to the terminal device, wherein the second configuration information comprises: a time point at which the terminal device listens to the paging message and the first preset listening time; the first preset listening time; a time point at which the terminal device listens to the paging message and the first preset quantity of listening times; or the first preset quantity of listening times.

11. The method according to claim 7, wherein before the buffering, by the network side device, downlink data of the terminal device, further comprising:
receiving, by the network side device, a type of the terminal device sent by the terminal device, and when the terminal device is a type of terminal device that is switched between the second non-activated state and the connected state, executing the step of buffering the downlink data of the terminal device when the second preset listening time or the second preset quantity of listening times is exceeded; or when the terminal device is a type of terminal device that is switched between the first non-activated state and the connected state, executing the step of buffering the downlink data when the terminal device is in the first non-activated state.

12. A data transmission apparatus comprising:
a processor;
a memory storing a program to be executed in the processor;
a transmitter; and
a receiver, wherein the program comprises instructions for setting, when uplink data does not need to be sent, the data transmission apparatus to be in a first non-activated state or a second non-activated state;

wherein when the data transmission apparatus is in the first non-activated state, the instructions cause the processor to not listen to a paging message; and
wherein when the data transmission apparatus is in the second non-activated state, the instructions cause the to listen to a paging message within a first preset listening time or a first preset quantity of listening times, and not listen to a paging message when the first listening time or the first quantity of listening times is exceeded, wherein the first non-activate state and the second non-activates state are not connected states;
wherein the instructions cause the processor to: set, when uplink data needs to be sent, the data transmission apparatus to be in a connected state;
wherein the transmitter is configured to transmit the uplink data after updating system information; and
wherein the receiver is configured to receive downlink data that is buffered by a network side device while the data transmission apparatus is in the first non-activated state or the second non-activated state.

13. The apparatus according to claim 12, wherein
the receiver is further configured to receive a connection release message sent by the network side device, and the instructions cause the processor to trigger to set the data transmission apparatus to be in the first non-activated state or the second non-activated state; or
the transmitter is further configured to transmit the uplink data and the receiver is further configured to receive the downlink data, the instructions cause the processor to trigger to set the data transmission apparatus to be in the first non-activated state or the second non-activated state; or
the transmitter is further configured to transmit the uplink data and hold for a preset connection holding time, the instructions cause the processor to trigger to set the data transmission apparatus to be in the first non-activated state or the second non-activated state; or
the instructions cause the processor to, after the data transmission apparatus has been set to be in the connected state for a preset connection holding time, trigger to set the data transmission apparatus to be in the first non-activated state or the second non-activated state.

14. The apparatus according to claim 13, wherein
the transmitter is configured to transmit first instruction information to the network side device, wherein the first instruction information is used to: instruct the network side device to skip releasing a connection between the network side device and the data transmission apparatus when a time for which the network side device and the data transmission apparatus are in the connected state is within the preset connection holding time; or instruct the network side device to skip releasing a connection between the network side device and the data transmission apparatus when a time of receiving the uplink data sent by the data transmission apparatus is within the preset connection holding time; and
the receiver is configured to receive first configuration information sent by the network side device, wherein the first configuration information comprises the preset connection holding time.

15. The apparatus according to claim 14, wherein
when the data transmission apparatus is switched between the second non-activated state and the connected state, the receiver is further configured to receive second configuration information sent by the network side device, wherein the second configuration information comprises:
a time point for listening to the paging message and the first preset listening time;
the first preset listening time;
a time point for listening to the paging message and the first preset quantity of listening times; or
the first preset quantity of listening times.

16. The apparatus according to claim 12, wherein:
the transmitter, configured to transmit, when the data transmission apparatus is in the connected state, second instruction information to the network side device, wherein the second instruction information is used to instruct the network side device to release the connection between the network side device and the data transmission apparatus.

17. The apparatus according to claim 12, wherein:
the transmitter, configured to transmit a type of the data transmission apparatus to the network side device if the data transmission apparatus is switched between the first non-activated state and the connected state, so that the network side device buffers the downlink data according to the type of the data transmission apparatus when the data transmission apparatus is in the first non-activated state, wherein the type of the data transmission apparatus is an apparatus that is switched between the first non-activated state and the connected state; or
the transmitter, configured to send a type of the data transmission apparatus to the network side device if the data transmission apparatus is switched between the second non-activated state and the connected state, so that the network side device buffers the downlink data according to the type of the data transmission apparatus when the data transmission apparatus is in the second non-activated state and does not listen to the paging message, wherein the type of the data transmission apparatus is an apparatus that is switched between the second non-activated state and the connected state.

18. A data transmission apparatus comprising:
a processor;
a memory storing a program to be executed in the processor, the program comprising instructions for
buffering downlink data of a terminal device in response to the terminal device being in a first non-activated state, wherein in the first non-activated state, the terminal device does not listen to a paging message; or
buffering in response to the terminal device being in a second non-activated state, downlink data of the terminal device when a second preset listening time or a second preset quantity of listening times for which the terminal device listens to a paging message is exceeded, wherein in the second non-activated state, the terminal device listens to a paging message within a first preset listening time or a first preset quantity of listening times, and does not listen to a paging message when the first listening time or the first quantity of listening times is exceeded, wherein the first non-activate state and the second non-activates state are not connected states; and
a receiver, configured to receive, when the terminal device enters a connected state in which the terminal device is connected to the data transmission apparatus, uplink data sent by the terminal device, and a transmitter, configured to transmit, to the terminal device, the downlink data that is buffered when the terminal device is in the first non-activated state or the second non-activated state.

19. The apparatus according to claim 18, wherein the receiver is configured to receive first instruction information sent by the terminal device; and if the first instruction information is used to instruct the data transmission apparatus to skip releasing a connection between the data transmission apparatus and the terminal device when a time for which the data transmission apparatus and the terminal device are in the connected state is within a preset connection holding time, the instructions cause the processor to release the connection between the data transmission apparatus and the terminal device according to the first instruction information after the time for which the data transmission apparatus and the terminal device are in the connected state is the preset connection holding time; or if the first instruction information instructs the data transmission apparatus to skip releasing a connection between the data transmission apparatus and the terminal device when a time for the data transmission apparatus to receive the uplink data sent by the terminal device is within the preset connection holding time, the instructions cause the processor to release the connection between the data transmission apparatus and the terminal device according to the first instruction information after the time for the data transmission apparatus to receive the uplink data is the preset connection holding time; and the transmitter is configured to transmit first configuration information to the terminal device, wherein the first configuration information comprises the preset connection holding time.

20. The apparatus according to claim 19, wherein if the instructions cause the processor to buffer the downlink data of the terminal device when the second preset listening time or the second preset quantity of listening times is exceeded, the transmitter is further configured to transmit second configuration information to the terminal device, wherein the second configuration information comprises:

a time point at which the terminal device listens to the paging message and the first preset listening time;

the first preset listening time;

a time point at which the terminal device listens to the paging message and the first preset quantity of listening times; or the first preset quantity of listening times.

* * * * *